(12) United States Patent
Huynh

(10) Patent No.: US 10,926,867 B2
(45) Date of Patent: Feb. 23, 2021

(54) DISTRIBUTED TRAILING EDGE WING FLAP SYSTEMS

(71) Applicant: The Boeing Company, Chicago, IL (US)

(72) Inventor: Neal V. Huynh, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 257 days.

(21) Appl. No.: 16/126,671

(22) Filed: Sep. 10, 2018

(65) Prior Publication Data

US 2020/0079497 A1    Mar. 12, 2020

(51) Int. Cl.
*B64C 13/42*    (2006.01)
*B64C 13/28*    (2006.01)
(Continued)

(52) U.S. Cl.
CPC ............ *B64C 13/42* (2013.01); *B64C 9/20* (2013.01); *B64C 13/341* (2018.01); *B64C 13/505* (2018.01)

(58) Field of Classification Search
CPC ....... B64C 13/40; B64C 13/505; B64C 13/42; B64C 13/50; B64C 13/503; B64C 9/16
See application file for complete search history.

(56) References Cited

U.S. PATENT DOCUMENTS 6,799,739 B1    10/2004  Jones
7,048,234 B2 *   5/2006  Recksiek ........... B64D 45/0005
                                                     244/213
(Continued)

FOREIGN PATENT DOCUMENTS

EP    1721825    11/2006
EP    1721826    11/2006
(Continued)

OTHER PUBLICATIONS

European Patent Office, "Extended European Search Report," issued in connection with European Patent Application No. 19193891.9, dated Feb. 12, 2020, 11 pages.
(Continued)

*Primary Examiner* — Justin M Benedik
(74) *Attorney, Agent, or Firm* — Hanley, Flight & Zimmerman, LLC

(57) ABSTRACT

Distributed trailing edge wing flap systems are described. An example wing flap system for an aircraft includes a flap and first and second actuators. The flap is movable between a deployed position and a retracted position relative to a fixed trailing edge of a wing of the aircraft. The first and second actuators are configured to move the flap relative to the fixed trailing edge. The first actuator is actuatable via pressurized hydraulic fluid to be supplied from a hydraulic system of the aircraft to the first actuator via a hydraulic module operatively coupled to the first actuator. The first actuator is operatively coupled to a first shaft. The second actuator is actuatable via an electric motor of the second actuator. The electric motor is operatively coupled to an electrical system of the aircraft. The second actuator is operatively coupled to a second shaft. The first and second shafts are selectively operatively couplable via a clutch operatively positioned between the first and second shafts. The clutch is actuatable between a disengaged position in which the second shaft is operatively uncoupled from the first shaft and an engaged position in which the second shaft is operatively coupled to the first shaft.

21 Claims, 13 Drawing Sheets

(51) Int. Cl.
  *B64C 13/50* (2006.01)
  *B64C 9/20* (2006.01)

(56) References Cited

U.S. PATENT DOCUMENTS

| | | | |
|---|---|---|---|
| 8,434,301 B2 | 5/2013 | Fukui | |
| 10,538,310 B2 | 1/2020 | Polcuch | |
| 2004/0075020 A1* | 4/2004 | Trikha | B64C 13/505 244/99.4 |
| 2006/0043242 A1 | 3/2006 | Benson | |
| 2006/0144996 A1 | 7/2006 | Carl et al. | |
| 2010/0089053 A1 | 4/2010 | Hanlon et al. | |
| 2010/0288886 A1* | 11/2010 | Schievelbusch | B64D 45/0005 244/194 |
| 2011/0062282 A1* | 3/2011 | Richter | B64D 45/0005 244/99.4 |
| 2014/0175216 A1 | 6/2014 | Ishihara | |
| 2015/0090843 A1 | 4/2015 | Guering | |
| 2016/0009375 A1 | 1/2016 | Young et al. | |
| 2018/0156293 A1 | 6/2018 | Fox et al. | |
| 2018/0178902 A1 | 6/2018 | Nfonguem et al. | |
| 2019/0217944 A1 | 7/2019 | Huynh | |
| 2019/0291850 A1 | 9/2019 | Huynh | |
| 2019/0308719 A1 | 10/2019 | Huynh | |
| 2020/0070929 A1 | 3/2020 | Huynh | |
| 2020/0070959 A1 | 3/2020 | Huynh | |

FOREIGN PATENT DOCUMENTS

| | | |
|---|---|---|
| EP | 2202146 | 6/2010 |
| EP | 2524865 | 11/2012 |
| EP | 2955104 | 12/2015 |
| EP | 3121116 | 1/2017 |
| EP | 3549857 | 10/2019 |

OTHER PUBLICATIONS

United States Patent and Trademark Office, "Non-Final Office Action," issued in connection with U.S. Appl. No. 16/122,519, dated Aug. 6, 2020, 6 pages.

European Patent Office, "Extended European Search Report," issued in connection with European Patent Application No. 19166351.7, dated Aug. 5, 2019, 6 pages.

United States Patent and Trademark Office, "Non-Final Office Action," issued in connection with U.S. Appl. No. 15/947,595, dated Aug. 6, 2020, 5 pages.

United States Patent and Trademark Office, "Requirement for Restriction," issued in connection with U.S. Appl. No. 15/926,477, dated Jul. 20, 2020, 6 pages.

United States Patent and Trademark Office, "Non-Final Office Action," issued in connection with U.S. Appl. No. 15/874,545, dated Aug. 18, 2020, 7 pages.

United States Patent and Trademark Office, "Notice of Allowance" issued in connection with U.S. Appl. No. 15/926,477, dated Nov. 9, 2020, 8 pages.

* cited by examiner

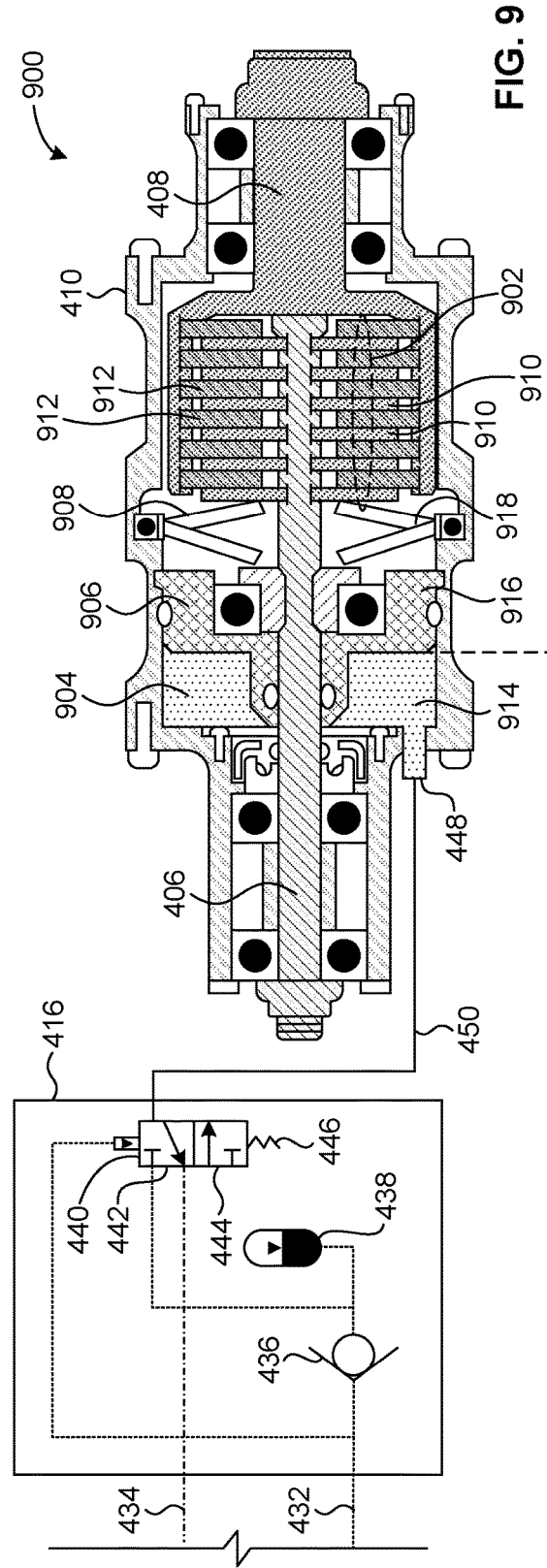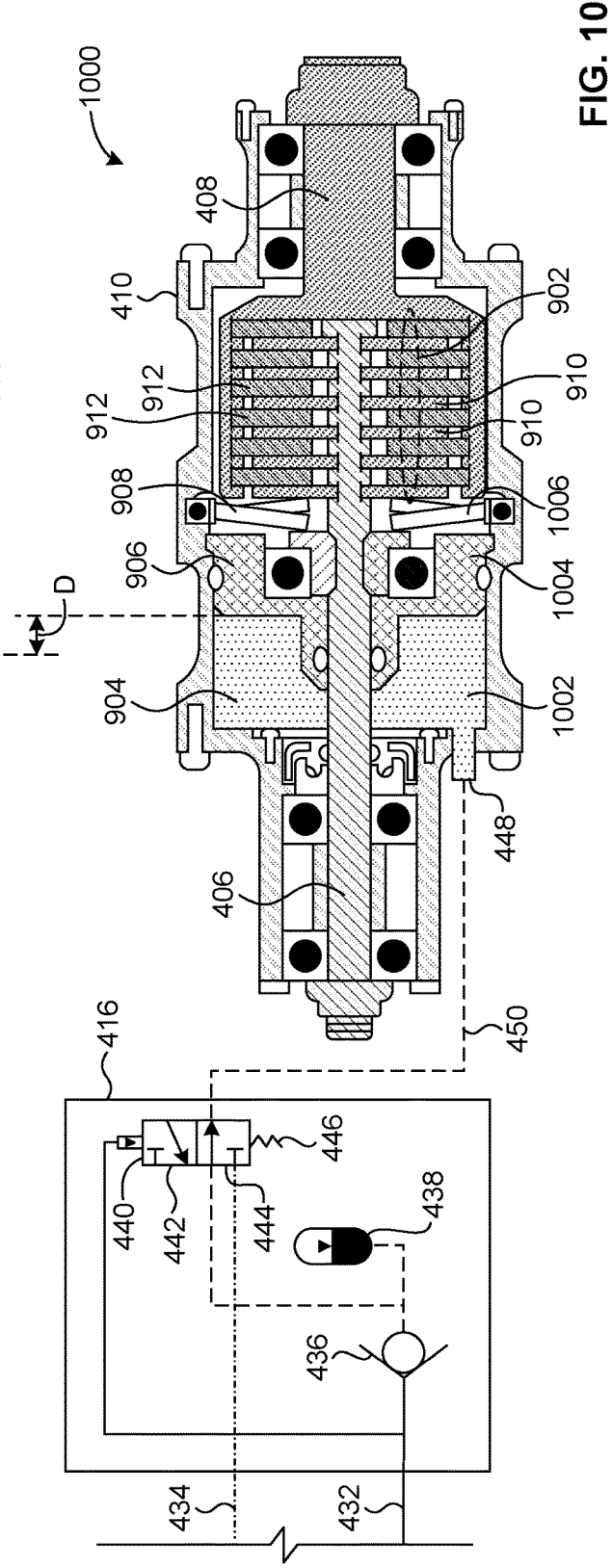

US 10,926,867 B2

DISTRIBUTED TRAILING EDGE WING FLAP SYSTEMS

FIELD OF THE DISCLOSURE

This disclosure relates generally to aircraft wing flaps and, more specifically, to distributed trailing edge wing flap systems.

BACKGROUND

Aircraft wings (e.g., the wings of a commercial aircraft) commonly include flaps (e.g., outboard flaps and/or inboard flaps) located at and/or along the respective fixed trailing edge of each aircraft wing. The flaps are movable relative to the fixed trailing edges of the aircraft wings between retracted and deployed positions. Deploying the flaps from the aircraft wings during flight (e.g., during landing) typically increases a lift characteristic associated with the aircraft wings, while retracting the flaps during flight (e.g., during cruise) typically reduces the lift characteristic.

SUMMARY

Distributed trailing edge wing flap systems are disclosed herein. In some examples, a wing flap system for an aircraft is disclosed. In some disclosed examples, the wing flap system comprises a flap and first and second actuators. In some disclosed examples, the flap is movable between a deployed position and a retracted position relative to a fixed trailing edge of a wing of the aircraft. In some disclosed examples, the first and second actuators are configured to move the flap relative to the fixed trailing edge. In some disclosed examples, the first actuator is actuatable via pressurized hydraulic fluid to be supplied from a hydraulic system of the aircraft to the first actuator via a hydraulic module operatively coupled to the first actuator. In some disclosed examples, the first actuator is operatively coupled to a first shaft. In some disclosed examples, the second actuator is actuatable via an electric motor of the second actuator. In some disclosed examples, the electric motor is operatively coupled to an electrical system of the aircraft. In some disclosed examples, the second actuator is operatively coupled to a second shaft. In some disclosed examples, the first and second shafts are selectively operatively couplable via a clutch operatively positioned between the first and second shafts. In some disclosed examples, the clutch is actuatable between a disengaged position in which the second shaft is operatively uncoupled from the first shaft and an engaged position in which the second shaft is operatively coupled to the first shaft.

In some examples, a method for operating a wing flap system of an aircraft is disclosed. In some disclosed examples of the method, the wing flap system includes a flap movable between a deployed position and a retracted position relative to a fixed trailing edge of a wing of the aircraft and further including first and second actuators configured to move the flap relative to the fixed trailing edge, the first actuator being operatively coupled to a first shaft, the second actuator being operatively coupled to a second shaft, the first and second shafts being selectively operatively couplable via a clutch operatively positioned between the first and second shafts. In some disclosed examples, the method comprises disengaging the clutch to operatively uncouple the first shaft from the second shaft. In some disclosed examples, the method further comprises commanding the first actuator to control movement of the flap relative to the fixed trailing edge, the first actuator being actuatable via pressurized hydraulic fluid to be supplied from a hydraulic system of the aircraft to the first actuator via a hydraulic module operatively coupled to the first actuator. In some disclosed examples, the method further comprises commanding the second actuator to control movement of the flap relative to the fixed trailing edge, the second actuator being actuatable via an electric motor of the second actuator, the electric motor being operatively coupled to an electrical system of the aircraft. In some disclosed examples, the method further comprises, in response to a failure of the hydraulic system or the hydraulic module, engaging the clutch to operatively couple the first shaft to the second shaft. In some disclosed examples, the method further comprises controlling movement of the first actuator via the second actuator in response to engaging the clutch.

BRIEF DESCRIPTION OF THE DRAWINGS

FIG. 9 is a schematic of the example hydromechanical clutch of FIG. 4 in an example disengaged position.

FIG. 10 is a schematic of the example hydromechanical clutch of FIG. 4 in an example engaged position.

Figure 1:
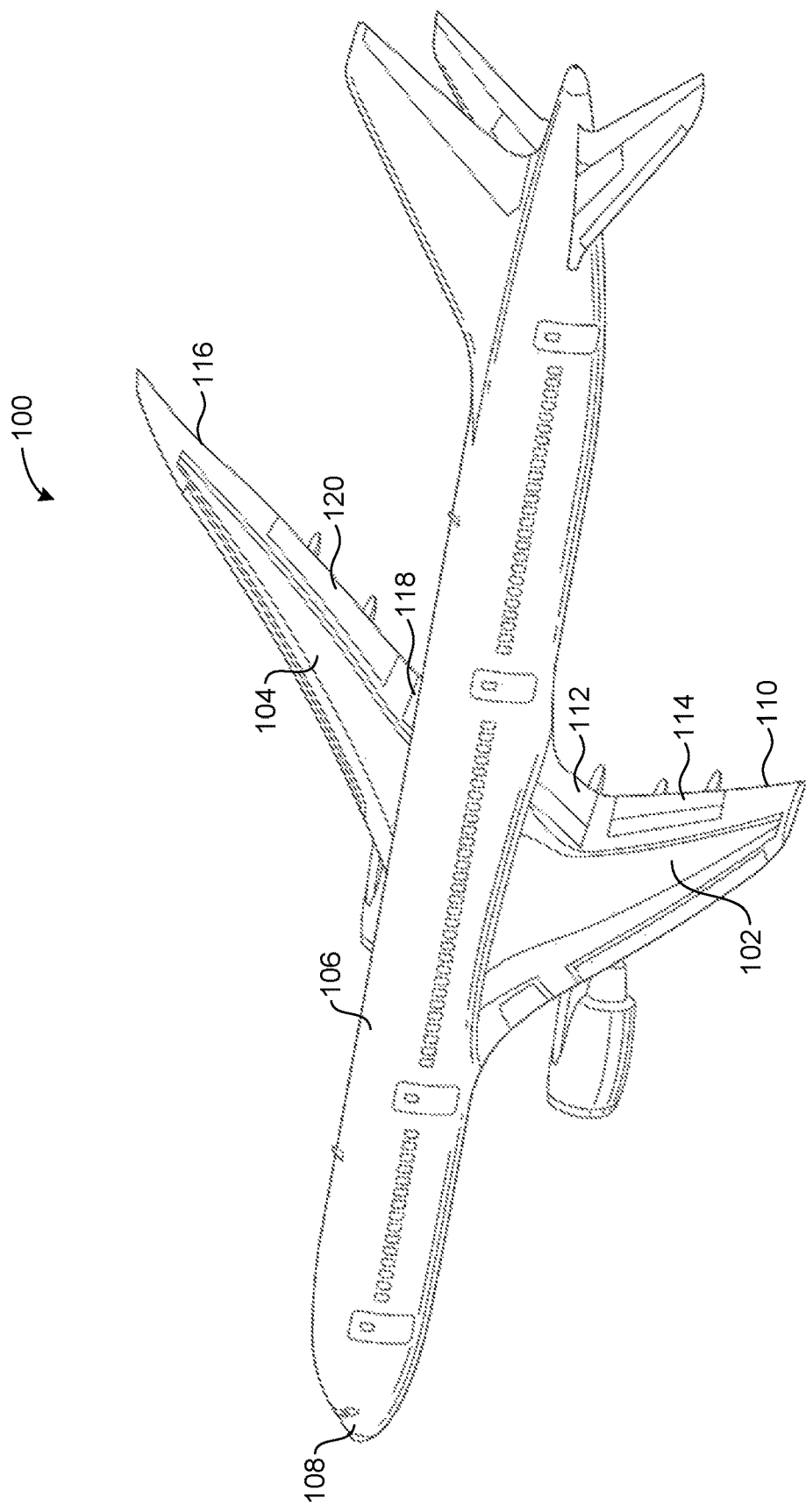
FIG. 1 illustrates an example aircraft in which an example distributed trailing edge wing flap system can be implemented in accordance with the teachings of this disclosure.

Certain examples are shown in the above-identified figures and described in detail below. In describing these examples, like or identical reference numbers are used to identify the same or similar elements. The figures are not necessarily to scale, and certain features and certain views of the figures may be shown exaggerated in scale or in schematic for clarity and/or conciseness.

DETAILED DESCRIPTION

Aircraft wings (e.g., the wings of a commercial aircraft) commonly include flaps (e.g., outboard flaps and/or inboard flaps) located at and/or along the respective fixed trailing edge of each aircraft wing. Conventional trailing edge wing flap systems may include actuators and/or ball screws arranged to move the flaps relative to the fixed trailing edges of the aircraft wings between retracted and deployed positions. In such conventional trailing edge wing flap systems, the actuators are connected via torque tubes to a power drive unit which is powered by multiple independent hydraulic or electrical systems of the aircraft. The actuators of such conventional trailing edge wing flap systems can be rendered inoperable in the event of a partial or complete failure of one or more of the hydraulic or electrical system(s), thereby leaving the aircraft without the ability to change and/or control the respective positions of the wing flaps (e.g., without the ability to maintain and/or to actuate a wing flap to the last commanded position of the wing flap).

In contrast to the conventional trailing edge wing flap systems described above, the example distributed trailing edge wing flap systems disclosed herein advantageously include a hydromechanical actuator and an electromechanical actuator to move a wing flap relative to the fixed trailing edge of an aircraft wing. The hydromechanical actuator is actuatable via pressurized hydraulic fluid to be supplied from a hydraulic system of the aircraft to the hydromechanical actuator via a hydraulic module operatively coupled to the hydromechanical actuator. The electromechanical actuator is actuatable via an electric motor of the electromechanical actuator that is operatively coupled to an electrical system of the aircraft. A first shaft is operatively coupled to the hydromechanical actuator, and a second shaft is operatively coupled to the electromechanical actuator. A hydromechanical clutch is operatively positioned between the first shaft and the second shaft. The hydromechanical clutch is actuatable between a disengaged position and an engaged position. The second shaft is operatively uncoupled from the first shaft when the hydromechanical clutch is in the disengaged position. The second shaft is operatively coupled to the first shaft when the hydromechanical clutch is in the engaged position.

The hydromechanical actuator can advantageously be actuated by either of two independent mechanisms. First, the hydromechanical actuator can be actuated via the hydraulic module when the hydraulic system and the hydraulic module are operational, functional, and/or active. Second, in the event of a hydraulic failure (e.g., loss or reduction of pressurized hydraulic fluid) of the hydraulic system or the hydraulic module, the hydromechanical actuator can alternatively be actuated via the first shaft, the clutch, and the second shaft under the control of the electromechanical actuator.

FIG. 1 illustrates an example aircraft 100 in which an example distributed trailing edge wing flap system can be implemented in accordance with the teachings of this disclosure. Example distributed trailing edge wing flap systems disclosed herein can be implemented in commercial aircraft (e.g., the aircraft 100 of FIG. 1) as well as other types of aircraft (e.g., military aircraft, unmanned aerial vehicles, etc.). The aircraft 100 of FIG. 1 includes an example first wing 102, an example second wing 104, an example fuselage 106, and an example cockpit area 108. The first wing 102 includes an example first fixed trailing edge 110, an example first inboard flap 112, and an example first outboard flap 114. The first inboard flap 112 and the first outboard flap 114 are respectively located at and/or along the first fixed trailing edge 110 of the first wing 102. The second wing 104 includes an example second fixed trailing edge 116, an example second inboard flap 118, and an example second outboard flap 120. The second inboard flap 118 and the second outboard flap 120 are respectively located at and/or along the second fixed trailing edge 116 of the second wing 104.

In the illustrated example of FIG. 1, the first inboard flap 112 and the first outboard flap 114 are shown in respective retracted positions relative to the first fixed trailing edge 110 of the first wing 102, and the second inboard flap 118 and the second outboard flap 120 are shown in respective retracted positions relative to the second fixed trailing edge 116 of the second wing 104. The first inboard flap 112 and the first outboard flap 114 are movable and/or actuatable between the respective retracted positions shown in FIG. 1 and respective deployed positions in which the first inboard flap 112 and the first outboard flap 114 are extended rearward and/or downward from the first fixed trailing edge 110 of the first wing 102. The second inboard flap 118 and the second outboard flap 120 are similarly movable and/or actuatable between the respective retracted positions shown in FIG. 1 and respective deployed positions in which the second inboard flap 118 and the second outboard flap 120 are extended rearward and/or downward from the second fixed trailing edge 116 of the second wing 104. In some examples, respective ones of the wing flaps (e.g., the first inboard flap 112, the first outboard flap 114, the second inboard flap 118, and/or the second outboard flap 120) can be movable and/or actuatable to a variety of deployed positions corresponding to desired and/or commanded detents of the flaps (e.g., flaps thirty (F30), flaps forty (F40), etc.).

Figure 2A:
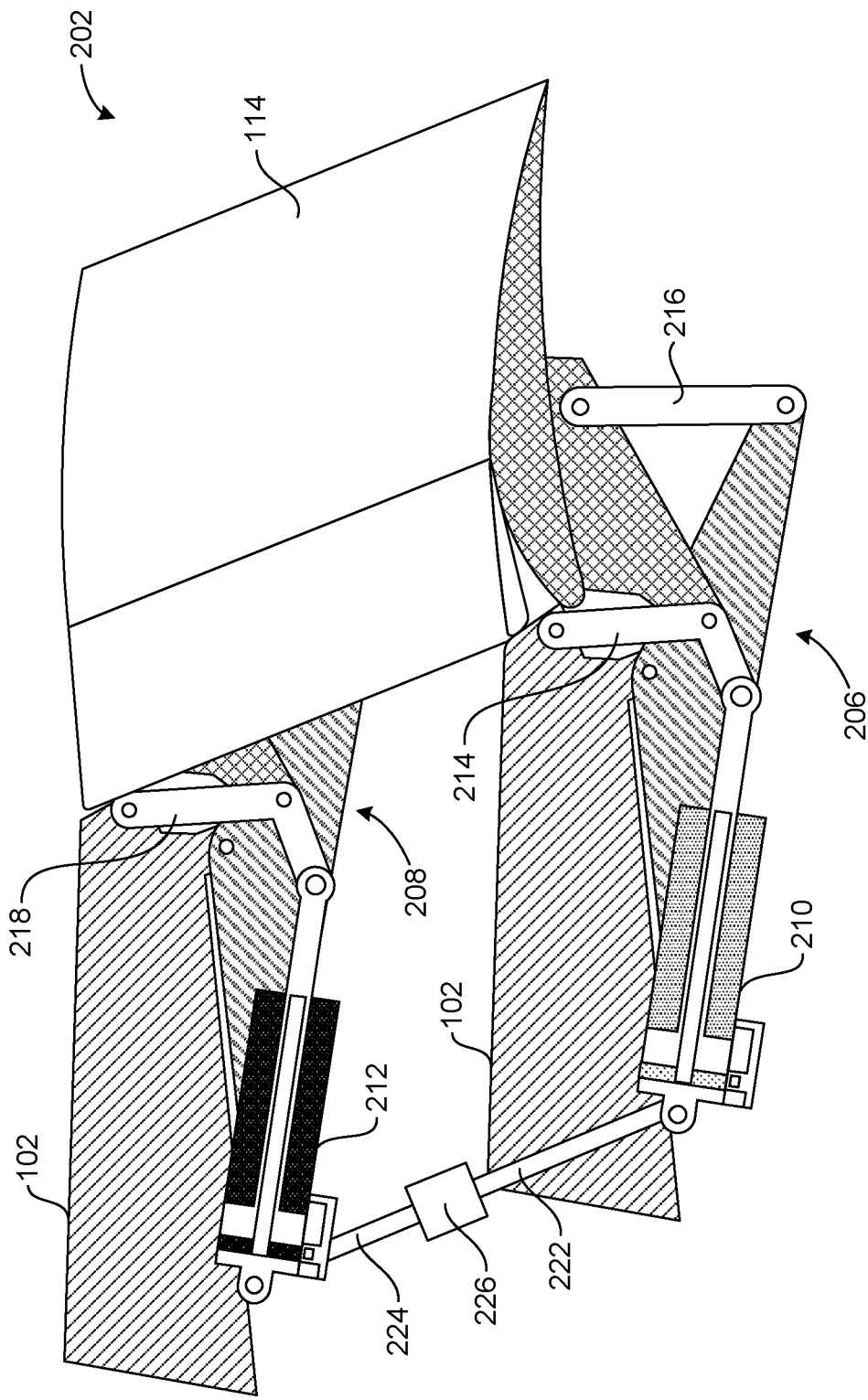
FIG. 2A is a perspective view of the example first outboard flap of the example first wing of FIG. 1 in an example retracted position.
Figure 2B:
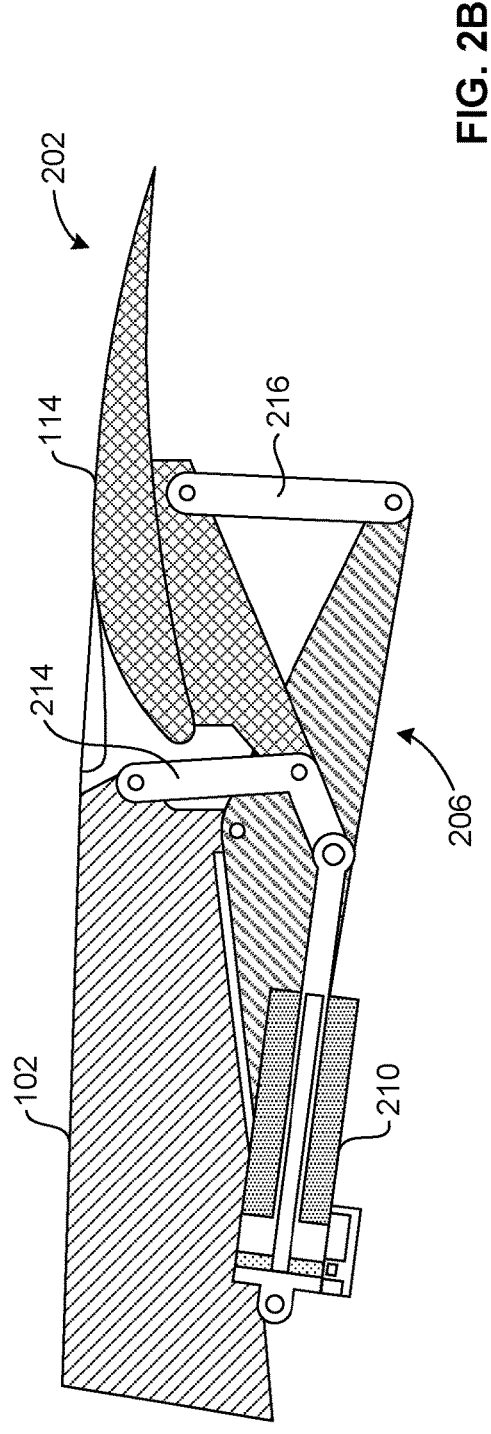
FIG. 2B is a first cross-sectional view of the example first outboard flap of the example first wing of FIG. 1 in the example retracted position of FIG. 2A.
Figure 2C:
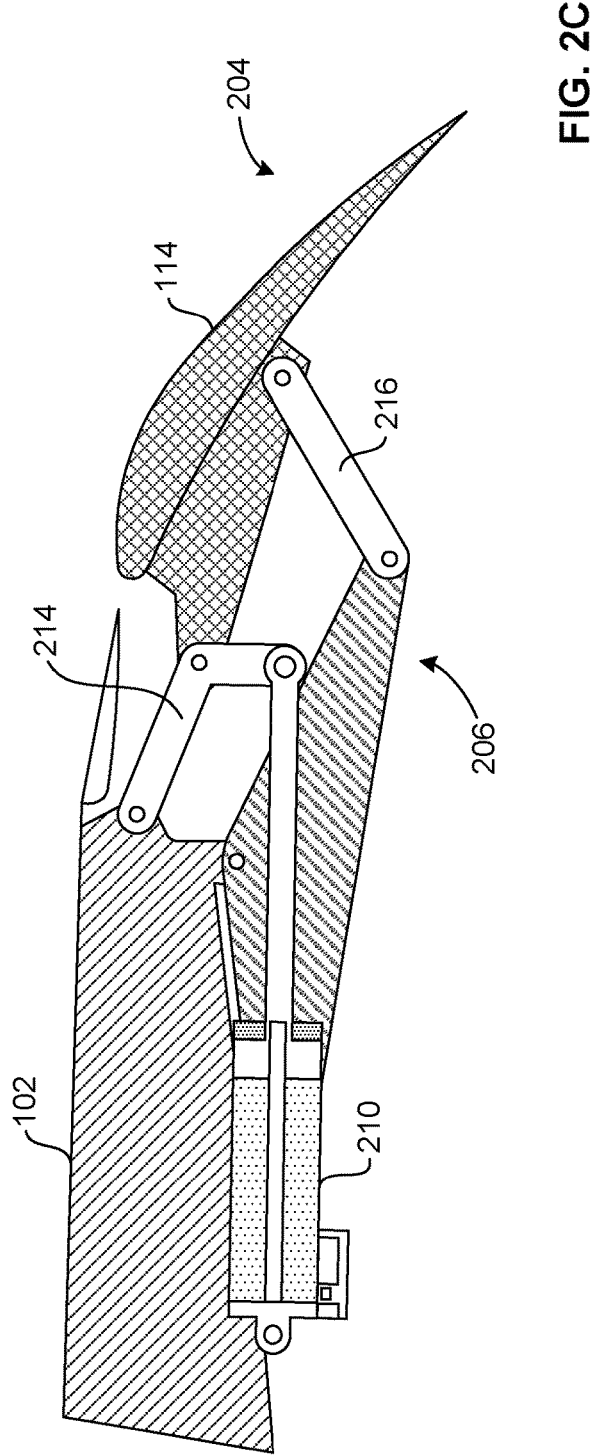
FIG. 2C is a first cross-sectional view of the example first outboard flap of the example first wing of FIG. 1 in an example deployed position.
Figure 2D:
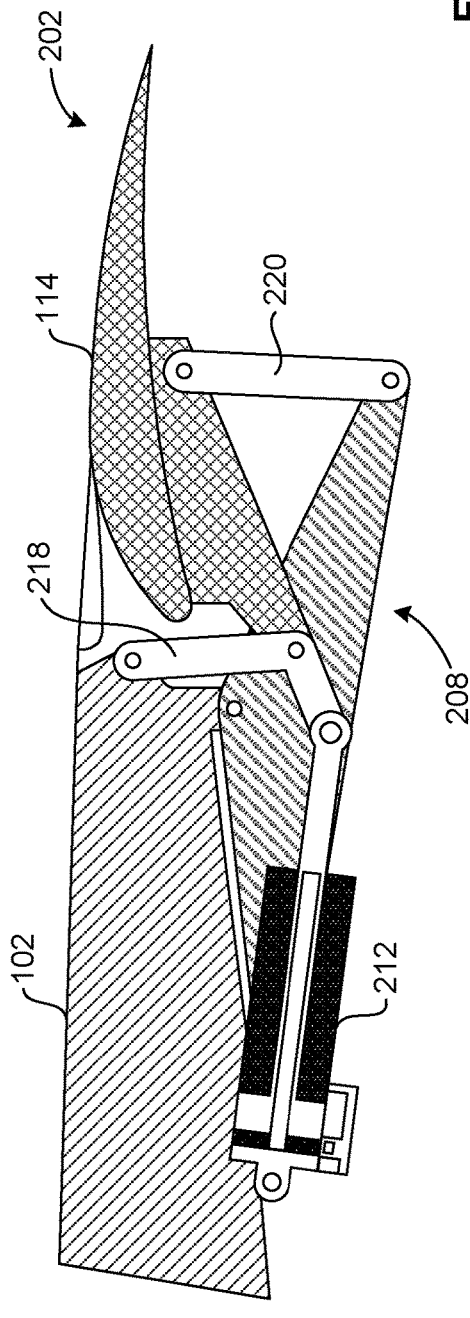
FIG. 2D is a second cross-sectional view of the example first outboard flap of the example first wing of FIG. 1 in the example retracted position of FIGS. 2A and 2B.
Figure 2E:
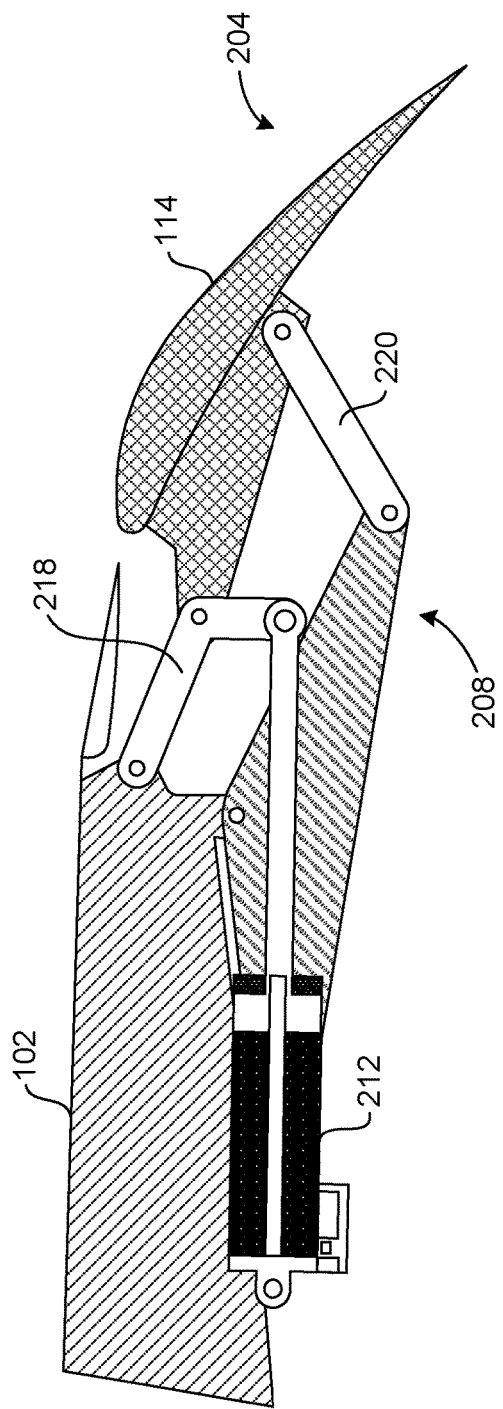
FIG. 2E is a second cross-sectional view of the example first outboard flap of the example first wing of FIG. 1 in the example deployed position of FIG. 2C.

In some examples, respective ones of the wing flaps (e.g., the first inboard flap 112, the first outboard flap 114, the second inboard flap 118, and/or the second outboard flap 120) can be movable and/or actuatable between a retracted position and a deployed position via one or more actuator(s) (e.g., one or more hydromechanical actuator(s), one or more electromechanical actuator(s), etc.). FIG. 2A is a perspective view of the example first outboard flap 114 of the example first wing 102 of FIG. 1 in an example retracted position 202. FIG. 2B is a first cross-sectional view of the example first outboard flap 114 of the example first wing 102 of FIG. 1 in the example retracted position 202 of FIG. 2A. FIG. 2C is a first cross-sectional view of the example first outboard flap 114 of the example first wing 102 of FIG. 1 in an example deployed position 204. The cross-sectional views of FIGS. 2B and 2C are taken at the hydromechanical actuator of FIG. 2A. FIG. 2D is a second cross-sectional view of the example first outboard flap 114 of the example first wing 102 of FIG. 1 in the example retracted position 202 of FIGS. 2A and 2B. FIG. 2E is a second cross-sectional view of the example first outboard flap 114 of the example first wing 102 of FIG. 1 in the example deployed position 204 of FIG. 2C. The cross-sectional views of FIGS. 2D and 2E are taken at the electromechanical actuator of FIG. 2A.

In the illustrated examples of FIGS. 2A-2E, the first outboard flap 114 is coupled to the first wing 102 via a first example linkage assembly 206 and a second example linkage assembly 208. The first outboard flap 114 is movable and/or actuatable between the retracted position 202 of FIGS. 2A, 2B and 2D and the deployed position 204 of FIGS. 2C and 2E via an example hydromechanical actuator (HMA) 210 coupled to the first linkage assembly 206 and to the first wing 102, and via an example electromechanical actuator (EMA) 212 coupled to the second linkage assembly 208 and to the first wing 102.

The first linkage assembly 206 of FIGS. 2A-2C includes an example first link 214 and an example second link 216. In the illustrated example of FIGS. 2A-2C, the first link 214 of the first linkage assembly 206 extends from the HMA 210 to the first outboard flap 114, and also extends to the first wing 102. The second link 216 of the first linkage assembly 206 extends from the first wing 102 to the first outboard flap 114. In other examples, the configuration of the first link 214 and/or the second link 216 of the first linkage assembly 206 can differ from that shown in FIGS. 2A-2C. In still other examples, the first linkage assembly 206 of FIGS. 2A-2C can include additional (e.g., a third, a fourth, a fifth, a sixth, etc.) links beyond the first and second links 214, 216 described above.

In the illustrated examples of FIGS. 2A-2C, the HMA 210 can be powered, controlled, and/or operated via a hydraulic module operatively coupled to the HMA 210. The hydraulic module can be located within the first wing 102 of the aircraft 100. The hydraulic module can be powered, controlled and/or operated by a hydraulic system of the aircraft 100 that is operatively coupled to the hydraulic module The hydraulic module can additionally be powered, controlled, and/or operated via a remote electronics unit (REU) operatively coupled to the hydraulic module. The REU can be located within the first wing 102 of the aircraft 100. The REU can be powered, controlled, and/or operated via one or more flight control electronics unit(s) (FCEU) operatively coupled to the REU and located within the fuselage 106 of the aircraft 100. The one or more FCEU(s) can be controlled and/or operated based on one or more input(s) received from a flap lever and/or a pilot control inceptor operatively coupled to the FCEU(s) and located in the cockpit area 108 of the aircraft 100.

The second linkage assembly 208 of FIGS. 2A, 2D and 2E includes an example first link 218 and an example second link 220. In the illustrated example of FIGS. 2A, 2D and 2E, the first link 218 of the second linkage assembly 208 extends from the EMA 212 to the first outboard flap 114, and also extends to the first wing 102. The second link 220 of the second linkage assembly 208 extends from the first wing 102 to the first outboard flap 114. In other examples, the configuration of the first link 218 and/or the second link 220 of the second linkage assembly 208 can differ from that shown in FIGS. 2A, 2D and 2E. In still other examples, the second linkage assembly 208 of FIGS. 2A, 2D and 2E can include additional (e.g., a third, a fourth, a fifth, a sixth, etc.) links beyond the first and second links 218, 220 described above.

In the illustrated examples of FIGS. 2A, 2D and 2E, the EMA 212 can be powered, controlled, and/or operated via an electric motor operatively coupled to the EMA 212. The electric motor can be located within the first wing 102 of the aircraft 100. The electric motor can be powered, controlled, and/or operated via an electronic motor control unit (EMCU) operatively coupled to the electric motor. The EMCU can be located within the first wing 102 of the aircraft 100. The EMCU can be powered by an electrical system of the aircraft 100 that is operatively coupled to the EMCU. The EMCU can be controlled and/or operated via a flight control electronics unit (FCEU) operatively coupled to the EMCU and located within the fuselage 106 of the aircraft 100. The FCEU can be controlled and/or operated based on one or more input(s) received from a flap lever and/or a pilot control inceptor operatively coupled to the FCEU and located in the cockpit area 108 of the aircraft 100.

As shown in FIG. 2A, an example first shaft 222 is operatively coupled to (e.g., in mechanical communication with) the HMA 210 of FIGS. 2A-2C. The first shaft 222 transfers rotational motion and torque to and/or from a gear train of the HMA 210. For example, as further described below in connection with FIGS. 4, 5, 9 and 10, the first shaft 222 can transfer rotational motion and torque from a gear train of the HMA 210 in response to actuation of the HMA 210, and can also transfer rotational motion and torque to the gear train of the HMA 210 in response to a load applied to the first shaft 222 via a clutch mechanism. As further shown in FIG. 2A, an example second shaft 224 is operatively coupled to (e.g., in mechanical communication with) the EMA 212 of FIGS. 2A, 2D and 2E. The second shaft 224 transfers rotational motion and torque to and/or from a gear train of the EMA 212. For example, as further described below in connection with FIGS. 4, 8, 9 and 10, the second shaft 224 can transfer rotational motion and torque from a gear train of the EMA 212 in response to actuation of the EMA 212. In some examples, the first shaft 222 and/or the second shaft 224 can be implemented as a straight shaft that is configured to transmit rotational motion and torque between two components that are aligned. In other examples, the first shaft 222 and/or the second shaft 224 can alternatively be implemented as a flexible shaft that is configured to transmit rotational motion and torque between two components that are not aligned.

As further shown in FIG. 2A, an example hydromechanical clutch (HMC) 226 is operatively positioned between the first shaft 222 and the second shaft 224. The HMC 226 is actuatable between a disengaged position and an engaged position. The second shaft 224 is operatively uncoupled from the first shaft 222 when the HMC 226 is in the disengaged position, thereby enabling the HMA 210 and the EMA 212 to operate independently of one another. For example, when the HMC 226 is in the disengaged position, actuation of the HMA 210 causes rotation of the first shaft 222, and actuation of the EMA 212 causes rotation of the second shaft 224, with the respective rotations of the first shaft 222 and the second shaft 224 being independent of one another and/or uncoupled via the HMC 226.

The second shaft 224 becomes operatively coupled to the first shaft 222 in response to the HMC 226 being actuated from the disengaged position into the engaged position, as may occur in response to a hydraulic failure (e.g., loss or reduction of pressurized hydraulic fluid) of the hydraulic system or the hydraulic module associated with the HMA 210. Operation of the HMA 210 is dependent upon operation of the EMA 212 when the HMC 226 is in the engaged position. For example, when the HMC 226 is in the disengaged position, actuation of the EMA 212 causes rotation of the second shaft 224, the rotation of the second shaft 224 causes a corresponding rotation of the first shaft 222 via the HMC 226, and the rotation of the first shaft 222 causes actuation of the HMA 210, with the respective rotations of the first shaft 222 and the second shaft 224 being dependent on one another and/or coupled via the HMC 226.

Figure 3:
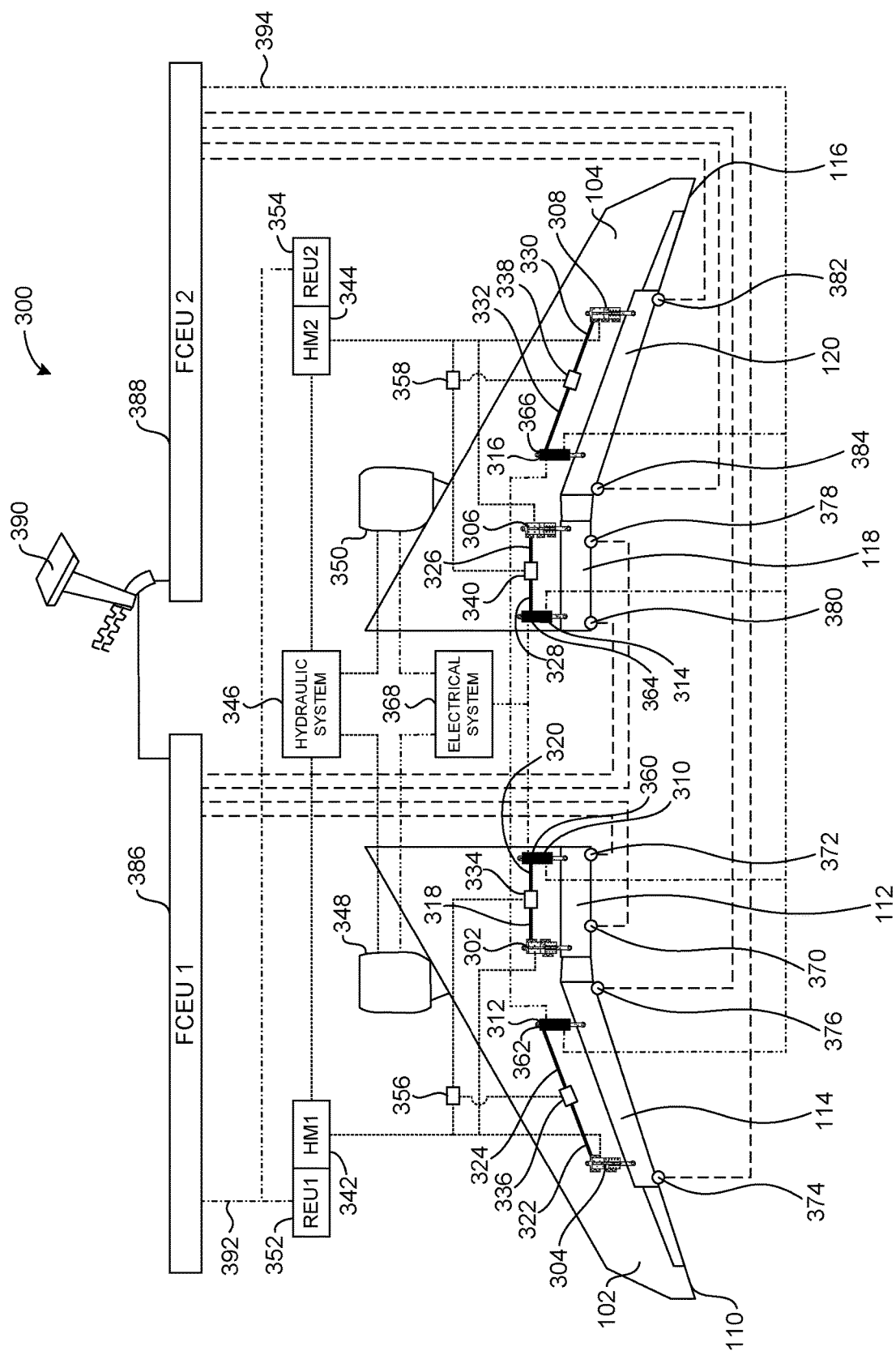
FIG. 3 is a schematic of an example distributed trailing edge wing flap system constructed in accordance with the teachings of this disclosure.

FIG. 3 is a schematic of an example distributed trailing edge wing flap system 300 constructed in accordance with the teachings of this disclosure. The distributed trailing edge wing flap system 300 of FIG. 3 can be implemented in the example aircraft 100 of FIG. 1 described above. In the illustrated example of FIG. 3, the distributed trailing edge wing flap system includes the first wing 102, the second wing 104, the first fixed trailing edge 110, the first inboard flap 112, the first outboard flap 114, the second fixed trailing edge 116, the second inboard flap 118, and the second outboard flap 120 of FIG. 1 described above.

The distributed trailing edge wing flap system 300 of FIG. 3 also includes a first example HMA 302, a second example HMA 304, a third example HMA 306, a fourth example HMA 308, a first example EMA 310, a second example EMA 312, a third example EMA 314, and a fourth example EMA 316. In the illustrated example of FIG. 3, the first HMA 302 and the first EMA 310 are respectively coupled to the first inboard flap 112 and to the first wing 102. The second HMA 304 and the second EMA 312 are respectively coupled to the first outboard flap 114 and to the first wing 102. The third HMA 306 and the third EMA 314 are respectively coupled to the second inboard flap 118 and to the second wing 104. The fourth HMA 308 and the fourth EMA 316 are respectively coupled to the second outboard flap 120 and to the second wing 104. An example HMA that can be used to implement respective ones of the first, second, third and fourth HMAs 302, 304, 306, 308 of FIG. 3 is further described below in connection with FIGS. 4-7. An example EMA that can be used to implement respective ones of the first, second, third and fourth EMAs 310, 312, 314, 316 of FIG. 3 is further described below in connection with FIGS. 4 and 8.

The first, second, third and fourth HMAs 302, 304, 306, 308 and the first, second, third and fourth EMAs 310, 312, 314, 316 respectively move and/or actuate correspondingly coupled ones of the first inboard flap 112, the first outboard flap 114, the second inboard flap 118, and the second outboard flap 120 between respective retracted positions and respective deployed positions. For example, in the illustrated example of FIG. 3, the first HMA 302 and the first EMA 310 move and/or actuate the first inboard flap 112 between a retracted position (as shown in FIG. 3) and a deployed position relative the first fixed trailing edge 110 of the first wing 102. The second HMA 304 and the second EMA 312 move and/or actuate the first outboard flap 114 between a retracted position (as shown in FIG. 3) and a deployed position relative the first fixed trailing edge 110 of the first wing 102. The third HMA 306 and the third EMA 314 move and/or actuate the second inboard flap 118 between a retracted position (as shown in FIG. 3) and a deployed position relative the second fixed trailing edge 116 of the second wing 104. The fourth HMA 308 and the fourth EMA 316 move and/or actuate the second outboard flap 120 between a retracted position (as shown in FIG. 3) and a deployed position relative the second fixed trailing edge 116 of the second wing 104.

Although not visible in FIG. 3, respective ones of the first, second, third and fourth HMAs 302, 304, 306, 308 and respective ones of the first, second, third and fourth EMAs 310, 312, 314, 316 include an actuator position feedback sensor to sense, measure and/or detect a position of the HMA or EMA. In some examples, the position of the HMA or EMA sensed, measured and/or detected via the actuator position feedback sensor can correspond to and/or indicate a position (e.g., a retracted position, a deployed position, etc.) of the corresponding wing flap to which the HMA or EMA is coupled. An actuator position feedback sensor that can be included in and/or implemented by respective ones of the first, second, third and fourth HMAs 302, 304, 306, 308 of FIG. 3 is further described below in connection with FIG. 5. An actuator position feedback sensor that can be included in and/or implemented by respective ones of the first, second, third and fourth EMAs 310, 312, 314, 316 of FIG. 3 is further described below in connection with FIG. 8.

The distributed trailing edge wing flap system 300 of FIG. 3 also includes a first example shaft 318, a second example shaft 320, a third example shaft 322, a fourth example shaft 324, a fifth example shaft 326, a sixth example shaft 328, a seventh example shaft 330, and an eighth example shaft 332. The first shaft 318 is operatively coupled to the first HMA 302 such that motion and/or movement of the first HMA 302 causes rotation of the first shaft 318. The second shaft 320 is operatively coupled to the first EMA 310 such that motion and/or movement of the first EMA 310 causes rotation of the second shaft 320. The third shaft 322 is operatively coupled to the second HMA 304 such that motion and/or movement of the second HMA 304 causes rotation of the third shaft 322. The fourth shaft 324 is operatively coupled to the second EMA 312 such that motion and/or movement of the second EMA 312 causes rotation of the fourth shaft 324. The fifth shaft 326 is operatively coupled to the third HMA 306 such that motion and/or movement of the third HMA 306 causes rotation of the fifth shaft 326. The sixth shaft 328 is operatively coupled to the third EMA 314 such that motion and/or movement of the third EMA 314 causes rotation of the sixth shaft 328. The seventh shaft 330 is operatively coupled to the fourth HMA 308 such that motion and/or movement of the fourth HMA 308 causes rotation of the seventh shaft 330. The eighth shaft 332 is operatively coupled to the fourth EMA 316 such that motion and/or movement of the fourth EMA 316 causes rotation of the eighth shaft 332. In some examples, the respective locations of an HMA and a corresponding EMA (e.g., the first HMA 302 and the first EMA 310) are optimized within and/or along the flap such that the lengths of the associated shafts (e.g., the first shaft 318 and the second shaft 320) located between the HMA and the EMA are as short as possible.

Respective ones of the first, second, third, fourth, fifth, sixth, seventh and eighth shafts 318, 320, 322, 324, 326, 328, 330, 332 transfer rotational motion and torque to and/or from gear trains of corresponding operatively coupled ones of the first, second, third and fourth HMAs 302, 304, 306, 308 and the first, second, third and fourth EMAs 310, 312, 314, 316. For example, the first shaft 318 can transfer rotational motion and torque to and/or from a gear train of the first HMA 302, and the second shaft 320 can transfer rotational motion and torque to and/or from a gear train of the first EMA 310. In some examples, respective ones of the first, second, third, fourth, fifth, sixth, seventh and eighth shafts 318, 320, 322, 324, 326, 328, 330, 332 can be implemented as a straight shaft that is configured to transmit rotational motion and torque between two components that are aligned. In other examples, respective ones of the first, second, third, fourth, fifth, sixth, seventh and eighth shafts 318, 320, 322, 324, 326, 328, 330, 332 can alternatively be implemented as a flexible shaft that is configured to transmit rotational motion and torque between two components that are not aligned. Example shafts that can be used to implement respective ones of the first, second, third, fourth, fifth, sixth, seventh and eighth shafts 318, 320, 322, 324, 326, 328, 330, 332 of FIG. 3 are further described below in connection with FIGS. 4, 5, 8, 9 and 10.

The distributed trailing edge wing flap system 300 of FIG. 3 also includes a first example HMC 334, a second example HMC 336, a third example HMC 338, and a fourth example HMC 340. Each one of the first, second, third and fourth HMCs 334, 336, 338, 340 of FIG. 3 is operatively positioned between and selectively operatively couples (e.g., selectively mechanically couples) a corresponding pair of shafts from among the first, second, third, fourth, fifth, sixth, seventh and eighth shafts 318, 320, 322, 324, 326, 328, 330, 332 of FIG. 3 described above.

For example, the first HMC 334 of FIG. 3 is operatively positioned between and selectively operatively couples (e.g., selectively mechanically couples) the first shaft 318 of FIG. 3 to the second shaft 320 of FIG. 3. When the first shaft 318 is operatively coupled to the second shaft 320 via the first HMC 334, motion and/or movement of the first EMA 310 is transferred to the first HMA 302 via the second shaft 320, the first HMC 334, and the first shaft 318. When the first shaft 318 is instead operatively uncoupled from the second shaft 320 via the first HMC 334, motion and/or movement of the first EMA 310 is not transferred to the first HMA 302.

The second HMC 336 of FIG. 3 is operatively positioned between and selectively operatively couples (e.g., selectively mechanically couples) the third shaft 322 of FIG. 3 to the fourth shaft 324 of FIG. 3. When the third shaft 322 is operatively coupled to the fourth shaft 324 via the second HMC 336, motion and/or movement of the second EMA 312 is transferred to the second HMA 304 via the fourth shaft 324, the second HMC 336, and the third shaft 322. When the third shaft 322 is instead operatively uncoupled from the fourth shaft 324 via the second HMC 336, motion and/or movement of the second EMA 312 is not transferred to the second HMA 304.

The third HMC 338 of FIG. 3 is operatively positioned between and selectively operatively couples (e.g., selectively mechanically couples) the fifth shaft 326 of FIG. 3 to the sixth shaft 328 of FIG. 3. When the fifth shaft 326 is operatively coupled to the sixth shaft 328 via the third HMC 338, motion and/or movement of the third EMA 314 is transferred to the third HMA 306 via the sixth shaft 328, the third HMC 338, and the fifth shaft 326. When the fifth shaft 326 is instead operatively uncoupled from the sixth shaft 328 via the third HMC 338, motion and/or movement of the third EMA 314 is not transferred to the third HMA 306.

The fourth HMC 340 of FIG. 3 is operatively positioned between and selectively operatively couples (e.g., selectively mechanically couples) the seventh shaft 330 of FIG. 3 to the eighth shaft 332 of FIG. 3. When the seventh shaft 330 is operatively coupled to the eighth shaft 332 via the fourth HMC 340, motion and/or movement of the fourth EMA 316 is transferred to the fourth HMA 308 via the eighth shaft 332, the fourth HMC 340, and the seventh shaft 330. When the seventh shaft 330 is instead operatively uncoupled from the eighth shaft 332 via the fourth HMC 340, motion and/or movement of the fourth EMA 316 is not transferred to the fourth HMA 308.

Each one of the first, second, third and fourth HMCs 334, 336, 338, 340 of FIG. 3 is actuatable between a disengaged position in which the HMC operatively uncouples two shafts from one another and an engaged position in which the HMC operatively couples the two shafts to one another. In some examples, respective ones of the first, second, third and fourth HMCs 334, 336, 338, 340 can be actuated from their respective disengaged positions into their respective engaged positions in response to a hydraulic failure (e.g., loss or reduction of pressurized hydraulic fluid) of a hydraulic system of the aircraft or a hydraulic failure of a hydraulic module associated with one or more of the first, second, third and/or fourth HMAs 302, 304, 306, 308 of FIG. 3. An example HMC that can be used to implement respective ones of the first, second, third and fourth HMCs 334, 336, 338, 340 of FIG. 3 is further described below in connection with FIGS. 4, 9 and 10.

The distributed trailing edge wing flap system 300 of FIG. 3 also includes a first example hydraulic module 342 and a second example hydraulic module 344. In some examples, the first hydraulic module 342 is located within the first wing 102, and the second hydraulic module 344 is located within the second wing 104. In the illustrated example of FIG. 3, the first hydraulic module 342 is operatively coupled to (e.g., in fluid communication with) and located remotely from the first HMA 302 and the second HMA 304. The second hydraulic module 344 is operatively coupled to (e.g., in fluid communication with) and located remotely from the third HMA 306 and the fourth HMA 308. In some examples, locating the first and second hydraulic modules 342, 344 remotely from the first, second, third and fourth HMAs 302, 304, 306, 308 advantageously enables the dimensions (e.g., widths and/or lengths) of aerodynamic fairings that respectively house the first, second, third and fourth HMAs 302, 304, 306, 308 to be reduced (e.g., minimized) and/or aerodynamically optimized. In some examples, implementing one hydraulic module to provide pressurized hydraulic fluid to at least two HMAs (e.g., implementing the first hydraulic module 342 to provide pressurized hydraulic fluid to the first and second HMAs 302, 304) advantageously increases (e.g., maximizes) an available volume for other system components and/or equipment to be installed aft of the rear spar of the wing of the aircraft. In other examples, systems integration of the aircraft requires one hydraulic module for each HMA. In such other examples, each hydraulic module may be located at a corresponding trailing edge flap, and all four hydraulic modules may receive pressurized hydraulic fluid supplied from the same hydraulic system of the aircraft. An example hydraulic module that can be used to implement respective ones of the first and second hydraulic modules 342, 344 of FIG. 3 is further described below in connection with FIGS. 4, 6 and 7.

The distributed trailing edge wing flap system 300 of FIG. 3 also includes an example hydraulic system 346 powered by a first example engine 348 and/or a second example engine 350. In the illustrated example of FIG. 3, the first engine 348 is coupled to the first wing 102, and the second engine 350 is coupled to the second wing 104. The first engine 348 and/or the second engine 350 power(s) the hydraulic system 346 to supply pressurized hydraulic fluid to respective ones of the first and second hydraulic modules 342, 344.

Pressurized hydraulic fluid supplied via the hydraulic system 346 of FIG. 3 to the first hydraulic module 342 can be delivered to respective ones of the first and second HMAs 302, 304 to move and/or actuate the first and second HMAs 302, 304. Pressurized hydraulic fluid contained within respective ones of the first and second HMAs 302, 304 can be returned to the hydraulic system 346 via the first hydraulic module 342. Pressurized hydraulic fluid supplied via the hydraulic system 346 of FIG. 3 to the second hydraulic module 344 can be delivered to respective ones of the third and fourth HMAs 306, 308 to move and/or actuate the third and fourth HMAs 306, 308. Pressurized hydraulic fluid contained within respective ones of the third and fourth HMAs 306, 308 can be returned to the hydraulic system 346 via the second hydraulic module 344.

The distributed trailing edge wing flap system 300 of FIG. 3 also includes a first example REU 352 and a second example REU 354. In some examples, the first REU 352 is located within the first wing 102, and the second REU 354 is located within the second wing 104. In the illustrated example of FIG. 3, the first REU 352 is located at and is operatively coupled to (e.g., in electrical communication with) the first hydraulic module 342, and the second REU 354 is located at and is operatively coupled to (e.g., in electrical communication with) the second hydraulic module 344. As further described below in connection with FIGS. 4-7, the first REU 352 controls the first hydraulic module 342, and the second REU 354 controls the second hydraulic module 344.

In some examples, the first REU 352 is further operatively coupled to (e.g., in electrical communication with) the actuator position feedback sensor(s) of the first HMA 302 and/or the second HMA 304, and the second REU 354 is further operatively coupled to (e.g., in electrical communication with) the actuator position feedback sensor(s) of the third HMA 306 and/or the fourth HMA 308. In such examples, the first REU 352 can control the first hydraulic module 342 based on actuator position feedback data obtained by the first REU 352 from the first and/or second actuator position feedback sensor(s) of corresponding ones of the first and/or second HMA(s) 302, 304, as further described below in connection with FIGS. 4-7. Similarly, the second REU 354 can control the second hydraulic module 344 based on actuator position feedback data obtained by the second REU 354 from the third and/or fourth actuator position feedback sensor(s) of corresponding ones of the third and/or fourth HMA(s) 306, 308.

The distributed trailing edge wing flap system 300 of FIG. 3 also includes a first example accumulator module 356 and a second example accumulator module 358. In some examples, the first accumulator module 356 is located within the first wing 102, and the second accumulator module 358 is located within the second wing 104. The first accumulator module 356 of FIG. 3 controls the selective actuation of the first and second HMCs 334, 336 of FIG. 3. The second accumulator module 358 of FIG. 3 controls the selective actuation of the third and fourth HMCs 338, 340 of FIG. 3. An example accumulator module that can be used to implement respective ones of the first and second accumulator modules 356, 358 of FIG. 3 is further described below in connection with FIGS. 4, 9 and 10

In the illustrated example of FIG. 3, the first accumulator module 356 is operatively positioned between and operatively coupled to (e.g., in fluid communication with) the first hydraulic module 342 and the first HMC 334, and is further operatively positioned between and operatively coupled to (e.g., in fluid communication with) the first hydraulic module 342 and the second HMC 336. The first accumulator module 356 of FIG. 3 receives pressurized hydraulic fluid from the hydraulic system 346 of FIG. 3 via the first hydraulic module 342 of FIG. 3 when the first hydraulic module 342 and the hydraulic system 346 of FIG. 3 are functional. In some examples, the first accumulator module 356 of FIG. 3 includes a first check valve, a first accumulator, and a first pressure-responsive valve that collectively control the selective actuation of the first and second HMCs 334, 336 of FIG. 3.

In the illustrated example of FIG. 3, the second accumulator module 358 is operatively positioned between and operatively coupled to (e.g., in fluid communication with) the second hydraulic module 344 and the third HMC 338, and is further operatively positioned between and operatively coupled to (e.g., in fluid communication with) the second hydraulic module 344 and the fourth HMC 340. The second accumulator module 358 of FIG. 3 receives pressurized hydraulic fluid from the hydraulic system 346 of FIG. 3 via the second hydraulic module 344 of FIG. 3 when the second hydraulic module 344 and the hydraulic system 346 of FIG. 3 are functional. In some examples, the second accumulator module 358 of FIG. 3 includes a second check valve, a second accumulator, and a second pressure-responsive valve that collectively control the selective actuation of the third and fourth HMCs 338, 340 of FIG. 3.

The distributed trailing edge wing flap system 300 of FIG. 3 also includes a first example EMCU 360, a second example EMCU 362, a third example EMCU 364, and a fourth example EMCU 366. In some examples, the first and second EMCUs 360, 362 are located within the first wing 102, and the third and fourth EMCUs 364, 366 are located within the second wing 104. In the illustrated example of FIG. 3, the first EMCU 360 is located at and is operatively coupled to (e.g., in electrical communication with) the first EMA 310, the second EMCU 362 is located at and is operatively coupled to (e.g., in electrical communication with) the second EMA 312, the third EMCU 364 is located at and is operatively coupled to (e.g., in electrical communication with) the third EMA 314, and the fourth EMCU 366 is located at and is operatively coupled to (e.g., in electrical communication with) the fourth EMA 316. Respective ones of the first, second, third and fourth EMCUs 360, 362, 364, 366 control corresponding ones of first, second, third and fourth electric motors of corresponding ones of the first, second, third and fourth EMAs 310, 312, 314, 316, as further described below in connection with FIGS. 4 and 8.

In some examples, the first EMCU 360 is further operatively coupled to (e.g., in electrical communication with) the actuator position feedback sensor of the first EMA 310, the second EMCU 362 is further operatively coupled to the actuator position feedback sensor of the second EMA 312, the third EMCU 364 is further operatively coupled to the actuator position feedback sensor of the third EMA 314, and the fourth EMCU 366 is further operatively coupled to the actuator position feedback sensor of the fourth EMA 316. In such examples, respective ones of the first, second, third and fourth EMCUs 360, 362, 364, 366 can control corresponding ones of first, second, third and fourth electric motors of corresponding ones of the first, second, third and fourth EMAs 310, 312, 314, 316 based on actuator position feedback data obtained by respective ones of the first, second, third and fourth EMCUs 360, 362, 364, 366 from corresponding ones of the first, second, third and fourth actuator position feedback sensors of corresponding ones of the first, second, third and fourth EMAs 310, 312, 314, 316, as further described below in connection with FIGS. 4 and 8. An example EMCU that can be used to implement respective ones of the first, second, third and fourth EMCUs 360, 362, 364, 366 of FIG. 3 is further described below in connection with FIGS. 4 and 8.

The distributed trailing edge wing flap system 300 of FIG. 3 also includes an example electrical system 368 powered by the first engine 348 and/or the second engine 350. In the illustrated example of FIG. 3, the first engine 348 is coupled to the first wing 102, and the second engine 350 is coupled to the second wing 104. The first engine 348 and/or the second engine 350 power(s) the electrical system 368 to supply electrical power. The electrical system 368 (including the electrical power supplied and/or delivered thereby) is operatively coupled to respective ones of the first, second, third and fourth electric motors of corresponding ones of the first, second, third and fourth EMAs 310, 312, 314, 316 of FIG. 3 via corresponding ones of the first, second, third and fourth EMCUs 360, 362, 364, 366 of FIG. 3.

The distributed trailing edge wing flap system 300 of FIG. 3 also includes a first example flap position sensor 370, a second example flap position sensor 372, a third example flap position sensor 374, a fourth example flap position sensor 376, a fifth example flap position sensor 378, a sixth example flap position sensor 380, a seventh example flap position sensor 382, and an eighth example flap position sensor 384. In the illustrated example of FIG. 3, the first flap position sensor 370 and the second flap position sensor 372 are respectively coupled to the first inboard flap 112 of the first wing 102. The third flap position sensor 374 and the fourth flap position sensor 376 are respectively coupled to the first outboard flap 114 of the first wing 102. The fifth flap position sensor 378 and the sixth flap position sensor 380 are respectively coupled to the second inboard flap 118 of the second wing 104. The seventh flap position sensor 382 and the eighth flap position sensor 384 are respectively coupled to the second outboard flap 120 of the second wing 104. Respective ones of the first, second, third, fourth, fifth, sixth, seventh and eighth flap position sensors 370, 372, 374, 376, 378, 380, 382, 384 sense, measure and/or detect a position of a correspondingly coupled one of the first inboard flap 112, the first outboard flap 114, the second inboard flap 118, and the second outboard flap 120. For example, the first flap position sensor 370 and the second flap position sensor 372 can respectively sense, measure and/or detect a position of the first inboard flap 112 of the first wing 102 relative to the first fixed trailing edge 110 of the first wing 102.

The distributed trailing edge wing flap system 300 of FIG. 3 also includes a first example FCEU 386, a second example FCEU 388, and an example flap lever 390. In some examples, the first FCEU 386 and the second FCEU 388 of FIG. 3 can be located within a fuselage of an aircraft (e.g., the fuselage 106 of the aircraft 100 of FIG. 1), and the flap lever 390 of FIG. 3 can be located in a cockpit area of the aircraft (e.g., the cockpit area 108 of the aircraft 100 of FIG. 1). The first FCEU 386 and the second FCEU 388 of FIG. 3 are respectively controlled and/or operated based on one or more input(s) received from the flap lever 390 of FIG. 3. In some examples, the position of the flap lever 390 can correspond to and/or otherwise be associated with a desired and/or commanded position and/or detent (e.g., flaps retracted, flaps thirty (F30), flaps forty (F40), etc.) of the first inboard flap 112, the first outboard flap 114, the second inboard flap 118, and/or the second outboard flap 120.

In the illustrated example of FIG. 3, the first FCEU 386 is operatively coupled to (e.g., in electrical communication with) respective ones of the first and second REUs 352, 354 via a first example databus 392. The first FCEU 386 can transmit and/or receive data (e.g., REU control data, hydraulic module control data, actuator position feedback sensor data, etc.) to and/from respective ones of the first and second REUs 352, 354 via the first databus 392. The first FCEU 386 is also operatively coupled to (e.g., in electrical communication with) respective ones of the first, second, fifth and sixth flap position sensors 370, 372, 378, 380. The first FCEU 386 can receive data (e.g., flap position sensor data) from respective ones of the first, second, fifth and sixth flap position sensors 370, 372, 378, 380.

The second FCEU 388 is operatively coupled to (e.g., in electrical communication with) respective ones of the first, second, third and fourth EMCUs 360, 362, 364, 366 via a second example databus 394. The second FCEU 388 can transmit and/or receive data (e.g., EMCU control data, electric motor control data, actuator position feedback sensor data, etc.) to and/from respective ones of the first, second, third and fourth EMCUs 360, 362, 364, 366 via the second databus 394. The second FCEU 388 is also operatively coupled to (e.g., in electrical communication with) respective ones of the third, fourth, seventh and eighth flap position sensors 374, 376, 382, 384. The second FCEU 388 can receive data (e.g., flap position sensor data) from respective ones of the third, fourth, seventh and eighth flap position sensors 374, 376, 382, 384.

In the illustrated example of FIG. 3, the second FCEU 388 controls respective ones of the first, second, third and fourth EMCUs 360, 362, 364, 366, which in turn control the operation of corresponding ones of the first, second, third and fourth electric motors of corresponding ones of the first, second, third and fourth EMAs 310, 312, 314, 316. Actuation of the first, second, third and/or fourth electric motor(s) of the corresponding ones of the first, second, third and fourth EMA(s) 310, 312, 314, 316 via the corresponding ones of the first, second, third and/or fourth EMCU(s) 360, 362, 364, 366 causes the first, second, third and/or fourth EMA(s) 310, 312, 314, 316 to control rotation of corresponding ones of the second, fourth, sixth and/or eighth shaft(s) 320, 324, 328, 332 of FIG. 3. When the first, second, third and/or fourth HMC(s) 334, 336, 338, 340 is/are in its/their engaged position(s), rotation of the respective ones of the second, fourth, sixth and/or eighth shaft(s) 320, 324, 328, 332 via the corresponding ones of the first, second, third and/or fourth EMA(s) 310, 312, 314, 316 causes rotation of corresponding ones of the first, third, fifth and/or seventh shaft(s) 318, 322, 326, 330, which in turn causes movement and/or actuation of corresponding ones of the first, second, third and/or fourth HMA(s) 302, 304, 306, 308 of FIG. 3, thereby moving and/or actuating corresponding ones of the first inboard flap 112, the first outboard flap 114, the second inboard flap 118, and/or the second outboard flap 120 to a predetermined position (e.g., flaps thirty (F30), flaps forty (F40), etc.).

Figure 4:
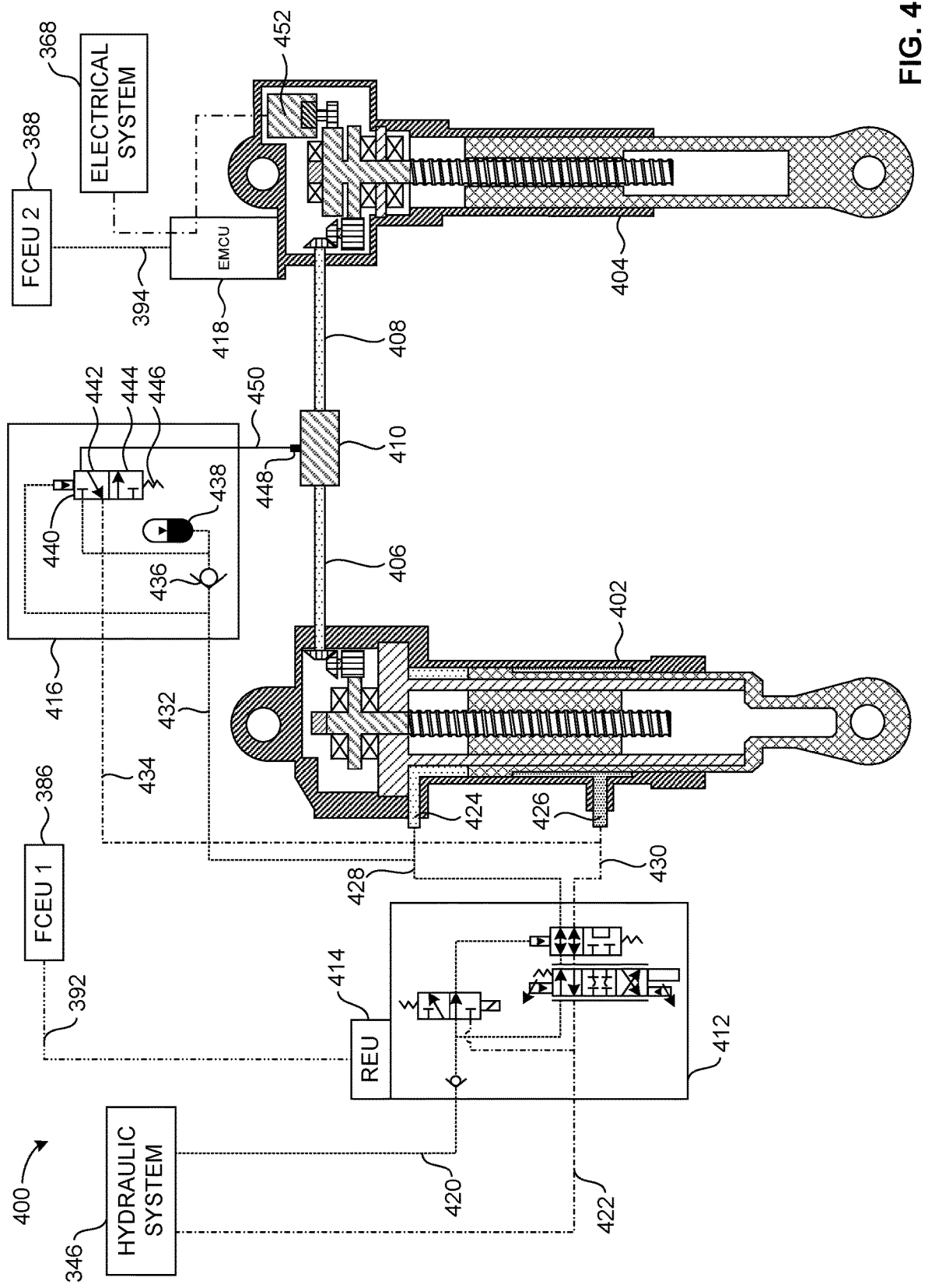
FIG. 4 is a schematic of an example subsystem of the example distributed trailing edge wing flap system of FIG. 3.

FIG. 4 is a schematic of an example subsystem 400 of the example distributed trailing edge wing flap system 300 of FIG. 3. The subsystem 400 of FIG. 4 includes the hydraulic system 346, the electrical system 368, the first FCEU 386, the second FCEU 388, the first databus 392, and the second databus 394 of FIG. 3 described above. The subsystem 400 of FIG. 4 further includes an example HMA 402, an example EMA 404, a first example shaft 406, a second example shaft 408, an example HMC 410, an example hydraulic module 412, an example REU 414, an example accumulator module 416, and an example EMCU 418. The subsystem 400 of FIG. 4 is representative of the structures and operative couplings associated with any one of the first inboard flap 112, the first outboard flap 114, the second inboard flap 118, or the second outboard flap 120 of FIG. 3 described above.

For example, the HMA 402, the EMA 404, the first shaft 406, the second shaft 408, the HMC 410, the hydraulic module 412, the REU 414, the accumulator module 416, and the EMCU 418 of FIG. 4 can correspond, respectively, to the first HMA 302, the first EMA 310, the first shaft 318, the second shaft 320, the first HMC 334, the first hydraulic module 342, the first REU 352, the first accumulator module 356, and the first EMCU 360 of FIG. 3 associated with the first inboard flap 112 of FIG. 3. As another example, the HMA 402, the EMA 404, the first shaft 406, the second shaft 408, the HMC 410, the hydraulic module 412, the REU 414, the accumulator module 416, and the EMCU 418 of FIG. 4 can correspond, respectively, to the second HMA 304, the second EMA 312, the third shaft 322, the fourth shaft 324, the second HMC 336, the first hydraulic module 342, the first REU 352, the first accumulator module 356, and the second EMCU 362 of FIG. 3 associated with the first outboard flap 114 of FIG. 3. As another example, the HMA 402, the EMA 404, the first shaft 406, the second shaft 408, the HMC 410, the hydraulic module 412, the REU 414, the accumulator module 416, and the EMCU 418 of FIG. 4 can correspond, respectively, to the third HMA 306, the third EMA 314, the fifth shaft 326, the sixth shaft 328, the third HMC 338, the second hydraulic module 344, the second REU 354, the second accumulator module 358, and the third EMCU 364 of FIG. 3 associated with the second inboard flap 118 of FIG. 3. As another example, the HMA 402, the EMA 404, the first shaft 406, the second shaft 408, the HMC 410, the hydraulic module 412, the REU 414, the accumulator module 416, and the EMCU 418 of FIG. 4 can correspond, respectively, to the fourth HMA 308, the fourth EMA 316, the seventh shaft 330, the eighth shaft 332, the fourth HMC 340, the second hydraulic module 344, the second REU 354, the second accumulator module 358, and the fourth EMCU 366 of FIG. 3 associated with the second outboard flap 120 of FIG. 3.

In the illustrated example of FIG. 4, the first shaft 406 is operatively coupled to (e.g., in mechanical communication with) the HMA 402, and the second shaft 408 is operatively coupled to (e.g., in mechanical communication with) the EMA 404. The HMC 410 of FIG. 4 is operatively positioned between the first shaft 406 and the second shaft 408. The HMC 410 selectively operatively couples (e.g., selectively mechanically couples) the first shaft 406 to the second shaft 408, as further described below. When the first shaft 406 is operatively coupled to the second shaft 408 via the HMC 410, motion and/or movement of the EMA 404 is transferred to the HMA 402 via the second shaft 408, the HMC 410, and the first shaft 406. When the first shaft 406 is instead operatively uncoupled from the second shaft 408 via the HMC 410, motion and/or movement of the EMA 404 is not transferred to the HMA 402.

The REU 414 of FIG. 4 is located at, and is operatively coupled to (e.g., in electrical communication with), the hydraulic module 412. The hydraulic module 412 of FIG. 4 is operatively positioned between the hydraulic system 346 and the HMA 402 of FIG. 4. The hydraulic system 346 of FIG. 4 is operatively coupled to (e.g., in fluid communication with) the hydraulic module 412 of FIG. 4 via an example hydraulic system supply line 420 and an example hydraulic system return line 422. The HMA 402 of FIG. 4 includes a first example port 424 and a second example port 426. The hydraulic module 412 of FIG. 4 is operatively coupled to (e.g., in fluid communication with) the first port 424 of the HMA 402 of FIG. 4 via an example first HMA port fluid line 428, and is operatively coupled to (e.g., in fluid communication with) the second port 426 of the HMA 402 of FIG. 4 via an example second HMA port fluid line 430.

The hydraulic module 412 of FIG. 4 is also operatively positioned between the hydraulic system 346 and the accumulator module 416 of FIG. 4. The hydraulic module 412 of FIG. 4 is operatively coupled to (e.g., in fluid communication with) the accumulator module 416 of FIG. 4 via an example accumulator module supply line 432 that branches to the accumulator module 416 from the first HMA port fluid line 428 of FIG. 4, and via an example accumulator module return line 434 that branches to the accumulator module 416 from the second HMA port fluid line 430 of FIG. 4.

The accumulator module 416 of FIG. 4 is operatively positioned between the hydraulic module 412 of FIG. 4 and the HMC 410 of FIG. 4. In the illustrated example of FIG. 4, the accumulator module 416 includes an example check valve 436, an example accumulator 438, and an example pressure-responsive valve 440. The check valve 436, the accumulator 438, and the pressure-responsive valve 440 of the accumulator module 416 of FIG. 4 collectively control the selective actuation of the HMC 410 of FIG. 4.

The check valve 436 of FIG. 4 blocks pressurized hydraulic fluid that has passed from the accumulator module supply line 432 of FIG. 4 through the check valve 436 in a first direction from returning through the check valve 436 in a second direction opposite the first direction to the accumulator module supply line 432. For example, the check valve 436 blocks pressurized hydraulic fluid that has passed from the accumulator module supply line 432 through the check valve 436 and into the accumulator 438 from returning from the accumulator 438 through the check valve 436 into the accumulator module supply line 432.

The accumulator 438 of FIG. 4 is a container and/or vessel that is structured and/or configured to collect and store a volume of pressurized hydraulic fluid. In the illustrated example of FIG. 4, the volume of pressurized hydraulic fluid collected and/or stored by the accumulator 438 of FIG. 4 is supplied via the hydraulic system 346 and the hydraulic module 412 of FIG. 4 when the hydraulic system 346 and the hydraulic module 412 are functional. The accumulator 438 of FIG. 4 is further structured and/or configured to deliver the collected and/or stored volume of pressurized hydraulic fluid from the accumulator 438 to the HMC 410 of FIG. 4 when such action is enabled by the pressure-responsive valve 440 of the accumulator module 416 of FIG. 4, as further described below.

The pressure-responsive valve 440 of FIG. 4 is a two-position valve having control ports that are movable and/or actuatable between an example first control port position 442 (e.g., a blocked flow position) and an example second control port position 444 (e.g., an unblocked flow position). The pressure-responsive valve 440 includes and/or is coupled to an example bias spring 446. The bias spring 446 biases the pressure-responsive valve 440 into and/or toward the second control port position 444 of the pressure-responsive valve 440. In the illustrated example of FIG. 4, the pressure-responsive valve is operatively coupled to (e.g., in fluid communication with) the accumulator module supply line 432. Pressurized hydraulic fluid supplied to the pressure-responsive valve 440 of FIG. 4 via the accumulator module supply line 432 of FIG. 4 moves the pressure-responsive valve 440 from the second control port position 444 into the first control port position 442 over the bias generated by the bias spring 446. In the absence of the pressurized hydraulic fluid being supplied to the pressure-responsive valve 440 of FIG. 4 via the accumulator module supply line 432 of FIG. 4 (e.g., as may occur in response to a hydraulic failure of the hydraulic system 346 or the hydraulic module 412 of FIG. 4), the bias spring 446 returns the pressure-responsive valve 440 from the first control port position 442 back into the second control port position 444.

The HMC 410 of FIG. 4 includes an example port 448. The accumulator module 416 of FIG. 4 is operatively coupled to (e.g., in fluid communication with) the port 448 of the HMC 410 of FIG. 4 via an example HMC port fluid line 450. When the pressure-responsive valve 440 of FIG. 4 is in the first control port position 442 described above, the pressure-responsive valve 440 blocks and/or prevents the volume of pressurized hydraulic fluid collected and/or stored by the accumulator 438 of FIG. 4 from being supplied and/or delivered via the HMC port fluid line 450 to the port 448 of the HMC 410. When the volume of pressurized hydraulic fluid collected and/or stored by the accumulator 438 of FIG. 4 has not been supplied and/or delivered to the HMC 410 of FIG. 4, the HMC 410 assumes a disengaged position in which the HMC 410 operatively uncouples the first shaft 406 of FIG. 4 from the second shaft 408 of FIG. 4, thereby operatively uncoupling the HMA 402 of FIG. 4 from the EMA 404 of FIG. 4.

When the pressure-responsive valve 440 of FIG. 4 is instead in the second control port position 444 described above, the pressure-responsive valve 440 allows and/or enables the volume of pressurized hydraulic fluid collected and/or stored by the accumulator 438 of FIG. 4 to be supplied and/or delivered via the HMC port fluid line 450 to the port 448 of the HMC 410. When the volume of pressurized hydraulic fluid collected and/or stored by the accumulator 438 of FIG. 4 has been supplied and/or delivered to the HMC 410 of FIG. 4, the HMC 410 assumes an engaged position in which the HMC 410 operatively couples the first shaft 406 of FIG. 4 to the second shaft 408 of FIG. 4, thereby operatively coupling the HMA 402 of FIG. 4 to the EMA 404 of FIG. 4.

The REU 414 of FIG. 4 is located at, and is operatively coupled to (e.g., in electrical communication with), the hydraulic module 412 of FIG. 4. The first FCEU 386 of FIG. 4 is operatively coupled to (e.g., in electrical communication with) the REU 414 of FIG. 4 via the first databus 392. The EMCU 418 of FIG. 4 is located at the EMA 404 of FIG. 4, and is operatively coupled to (e.g., in electrical communication with) an example electric motor 452 of the EMA 404 of FIG. 4. The electrical system 368 of FIG. 4 is operatively coupled to (e.g., in electrical communication with) the electric motor 452 of the EMA 404 via the EMCU 418 of FIG. 4. The second FCEU 388 of FIG. 4 is operatively coupled to (e.g., in electrical communication with) the EMCU 418 of FIG. 4 via the second databus 394. FIGS. 5-10 illustrate the HMA 402, the EMA 404, the first shaft 406, the second shaft 408, the HMC 410, the hydraulic module 412, the REU 414, the accumulator module 416, and the EMCU 418 of FIG. 4 in greater detail.

Figure 5:
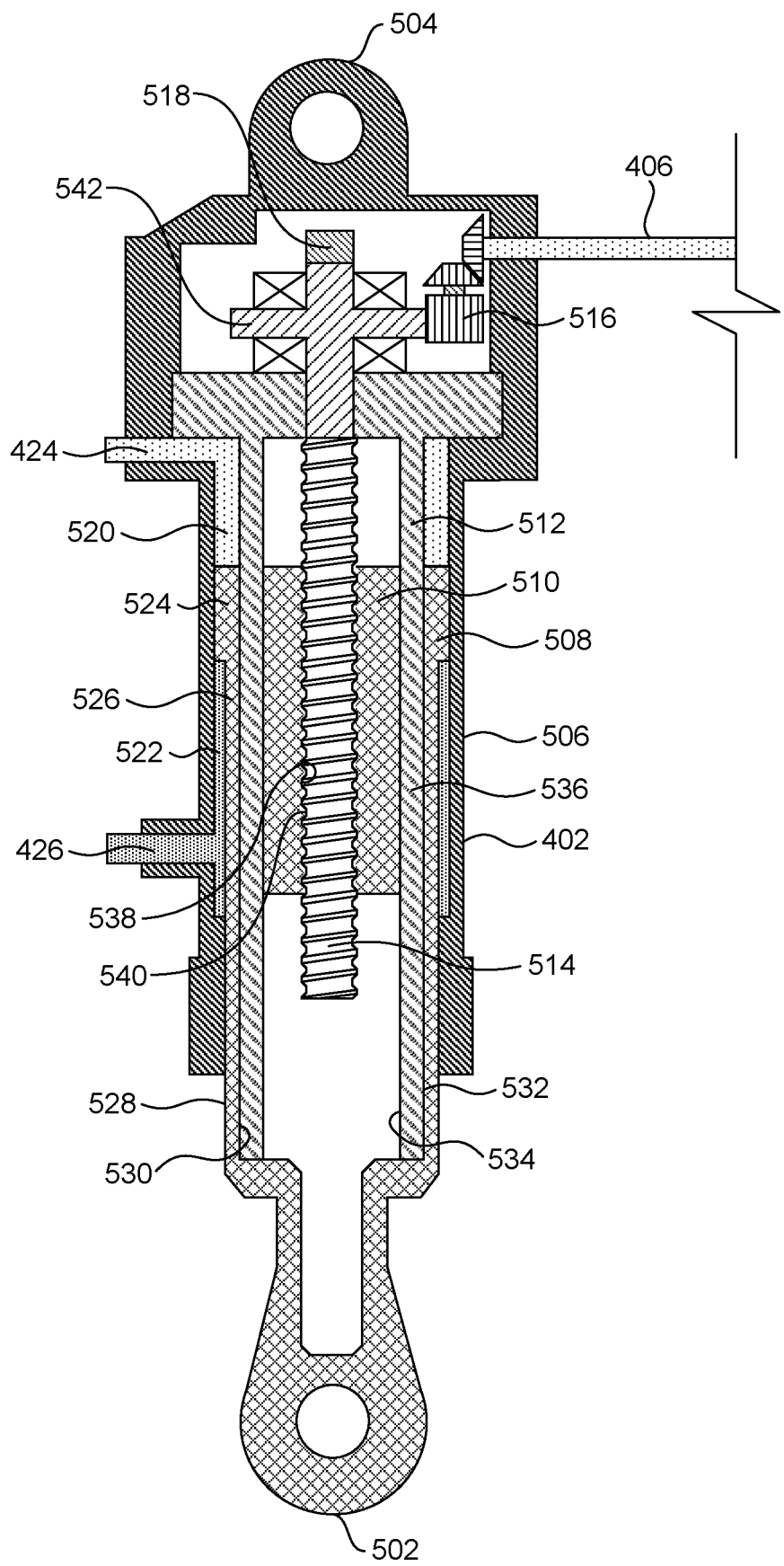
FIG. 5 is a schematic of the example hydromechanical actuator of FIG. 4.

FIG. 5 is a schematic of the example HMA 402 of FIG. 4. In the illustrated example of FIG. 5, the HMA 402 includes the first port 424 and the second port 426 of FIG. 4, and further includes an example first end 502, an example second end 504 located opposite the first end 502, an example cylinder 506, an example piston 508, an example ball nut 510, an example case 512, an example ball screw 514, an example gearset 516, an example actuator position feedback sensor 518, an example first fluid volume 520, and an example second fluid volume 522. The first end 502 of the HMA 402 can be coupled to a linkage assembly (e.g., the first linkage assembly 206 of FIGS. 2A-2C) of a wing flap (e.g., the first inboard flap 112, the first outboard flap 114, the second inboard flap 118, or the second outboard flap 120 of FIGS. 1 and 3), and the second end 504 of the HMA 402 can be coupled to a corresponding wing (e.g., the first wing 102 or the second wing 104 of FIGS. 1 and 3). The cylinder 506, the piston 508, the ball nut 510, the case 512, and the ball screw 514 of the HMA 402 have respective fixed lengths. The piston 508 is positioned, disposed, and/or received within the cylinder 506 and is movable and/or slidable relative to the cylinder 506 between a retracted position and an extended position. In some examples, the HMA 402 of FIG. 5 has a first length when the piston 508 is in the retracted position relative to the cylinder 506, and a second length greater than the first length when the piston 508 is in the extended position relative to the cylinder 506.

In the illustrated example of FIG. 5, the piston 508 and the ball nut 510 of FIG. 5 are coupled to one another and/or integrally formed such that the piston 508 and the ball nut 510 move together as a unit relative to the cylinder 506. The piston 508 of FIG. 5 includes an example head 524 and an example rod 526. The rod 526 includes an example outer surface 528 and an example inner surface 530. The case 512 of FIG. 5 includes an example outer surface 532, an example inner surface 534, and an example slotted portion 536 extending between the inner and outer surfaces 534, 532 of the case 512. The outer surface 532 of the case 512 extends along the inner surface 530 of the rod 526 of the piston 508. The slotted portion 536 of the case 512 receives the coupled and/or integrated piston 508 and ball nut 510. The slotted portion 536 of the case 512 enables translation (e.g., linear motion) of the coupled and/or integrated piston 508 and ball nut 510 relative to the cylinder 506, while also preventing rotation of the coupled and/or integrated piston 508 and ball nut 510 relative to the cylinder 506.

The head 524 of piston 508 is located and/or positioned within the cylinder 506 between the first fluid volume 520 and the second fluid volume 522. The first fluid volume 520 includes and/or is a first volume of pressurized hydraulic fluid. In the illustrated example of FIG. 5, the first fluid volume 520 is in fluid communication with the first port 424 of the HMA 402, and is bounded by the cylinder 506, the head 524 of the piston 508, and the outer surface 532 of the case 512. The second fluid volume 522 includes and/or is a second volume of pressurized hydraulic fluid that is isolated from the first volume of pressurized hydraulic fluid. In the illustrated example of FIG. 5, the second fluid volume 522 is in fluid communication with the second port 426 of the HMA 402, and is bounded by the cylinder 506, the head 524 of the piston 508, and the outer surface 528 of the rod 526 of the piston 508. In some examples, one or more seal(s) can be coupled to and/or disposed on the head 524 of the piston 508, on the outer surface 528 of the rod 526 of the piston 508, and/or on the outer surface 532 of the case 512. In such examples, the seal(s) can provide one or more interface(s) between the cylinder 506, the piston 508, and/or the case 512 to isolate the first fluid volume 520 from the second fluid volume 522.

Increasing the first fluid volume 520 of FIG. 5 (e.g., increasing the volume of the pressurized hydraulic fluid of the first fluid volume 520) causes the piston 508 of FIG. 5 to move and/or slide relative to the cylinder 506 of FIG. 5 away from a retracted position and toward an extended position. A wing flap coupled via a linkage assembly to the first end 502 of the HMA 402 can move away from a retracted position and toward a deployed position in response to the piston 508 moving away from the retracted position and toward the extended position. In the illustrated example of FIG. 5, the first fluid volume 520 has a minimum volume when the piston 508 is in the retracted position, and has a maximum volume when the piston 508 is in the extended position.

Increasing the second fluid volume 522 of FIG. 5 (e.g., increasing the volume of the pressurized hydraulic fluid of the second fluid volume 522) causes the piston 508 of FIG. 5 to move and/or slide relative to the cylinder 506 of FIG. 5 away from an extended position and toward a retracted position. A wing flap coupled via a linkage assembly to the first end 502 of the HMA 402 can move away from a deployed position and toward a retracted position in response to the piston 508 moving away from the extended position and toward the retracted position. In the illustrated example of FIG. 5, the second fluid volume 522 has a minimum volume when the piston 508 is in the extended position, and has a maximum volume when the piston 508 is in the retracted position.

As described above, the ball nut 510 is coupled to and/or integrally formed with the piston 508 such that the piston 508 and the ball nut 510 move and/or slide together as a unit relative to the cylinder 506. In the illustrated example of FIG. 5, the ball nut 510 includes an example threaded portion 538. The ball screw 514 includes an example threaded portion 540 configured to engage the threaded portion 538 of the ball nut 510. The ball nut 510 is prevented from rotating relative to the cylinder 506 as a result of the coupled and/or integrally formed piston 508 and ball nut 510 being positioned within the slotted portion 536 of the case 512. Accordingly, translation (e.g., linear movement) of the piston 508 and the ball nut 510 (e.g., as can occur in response to a change in the first fluid volume 520 and/or the second fluid volume 522, as described above) causes rotation of the ball screw 514. Conversely, rotation of the ball screw 514 (as can occur in response to rotation of the first shaft 406 of FIGS. 4 and 5, as further described below) causes translation of the ball nut 510 and the piston 508. Balls that function with the ball nut 510 and the ball screw 514 are omitted from FIGS. 4 and 5 in the interest of clarity of the figures.

In the illustrated example of FIG. 5, the ball screw 514 includes an example gear 542. The gear 542 can be coupled to and/or integrally formed with the ball screw 514. The gear 542 of the ball screw 514 engages the gearset 516 of the HMA 402, and the gearset 516 of the HMA 402 in turn engages the first shaft 406. The gearset 516 of FIG. 5 can include any number of gears to transfer rotational motion from the gear 542 of the ball screw 514 to the first shaft 406. In the illustrated example of FIG. 5, translation of the piston 508 and the ball nut 510 relative to the cylinder 506 causes rotation of the ball screw 514, which in turn causes rotation of the gear 542, which in turn causes rotation of the gearset 516, which in turn causes rotation of the first shaft 406. Conversely, rotation of the first shaft 406 causes rotation of the gearset 516, which in turn causes rotation of the gear 542, which in turn causes rotation of the ball screw 514, which in turn causes translation of the ball nut 510 and the piston 508 relative to the cylinder 506.

In the illustrated example of FIG. 5, the actuator position feedback sensor 518 is coupled to and/or mounted on the ball screw 514. The actuator position feedback sensor 518 senses, measures and/or detects a position of the ball screw 514 (e.g., a rotational position of the ball screw 514 relative to the cylinder 506), and/or a position of the piston 508 (e.g., a translational position of the piston 508 relative to the cylinder 506). The actuator position feedback sensor 518 of FIG. 5 is operatively coupled to (e.g., in electrical communication with) the REU 414 of FIG. 4 such that the REU 414 can receive and/or obtain actuator position feedback data sensed, measured and/or detected via the actuator position feedback sensor 518. Actuator position feedback data obtained by the REU 414 of FIG. 4 can be conveyed to the first FCEU 386 of FIG. 4 via the databus 392 of FIG. 4. In the illustrated example of FIGS. 4 and 5, the above-described electrical signals and/or connections between the REU 414 and the actuator position feedback sensor 518 of the HMA 402 are omitted in the interest of clarity of the figures.

The HMA 402 of FIGS. 4 and 5 can be actuated by either of two independent mechanisms. First, the HMA 402 can be actuated via the hydraulic system 346 and the hydraulic module 412 when the hydraulic system 346 and the hydraulic module 412 are operational, functional, and/or active. Second, in the event of a hydraulic failure (e.g., loss or reduction of pressurized hydraulic fluid) of the hydraulic system 346 or the hydraulic module 412, the HMA 402 can alternatively be actuated via the first shaft 406, the HMC 410, and the second shaft 408 under the control of the EMA 404 of FIGS. 4 and 8.

Figure 6:
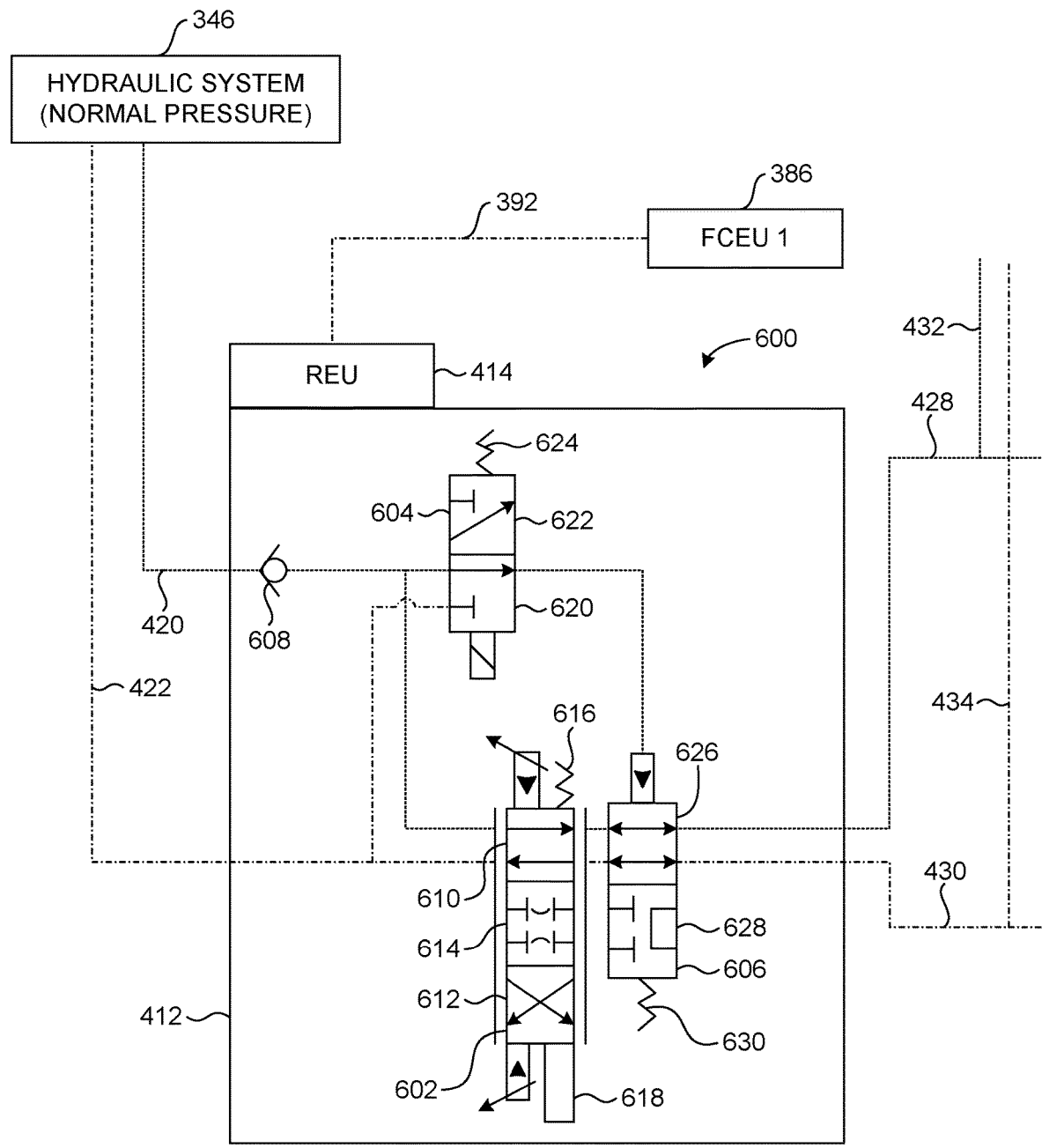
FIG. 6 is a schematic of the example hydraulic module of FIG. 4 in a first example operational mode.
Figure 7:
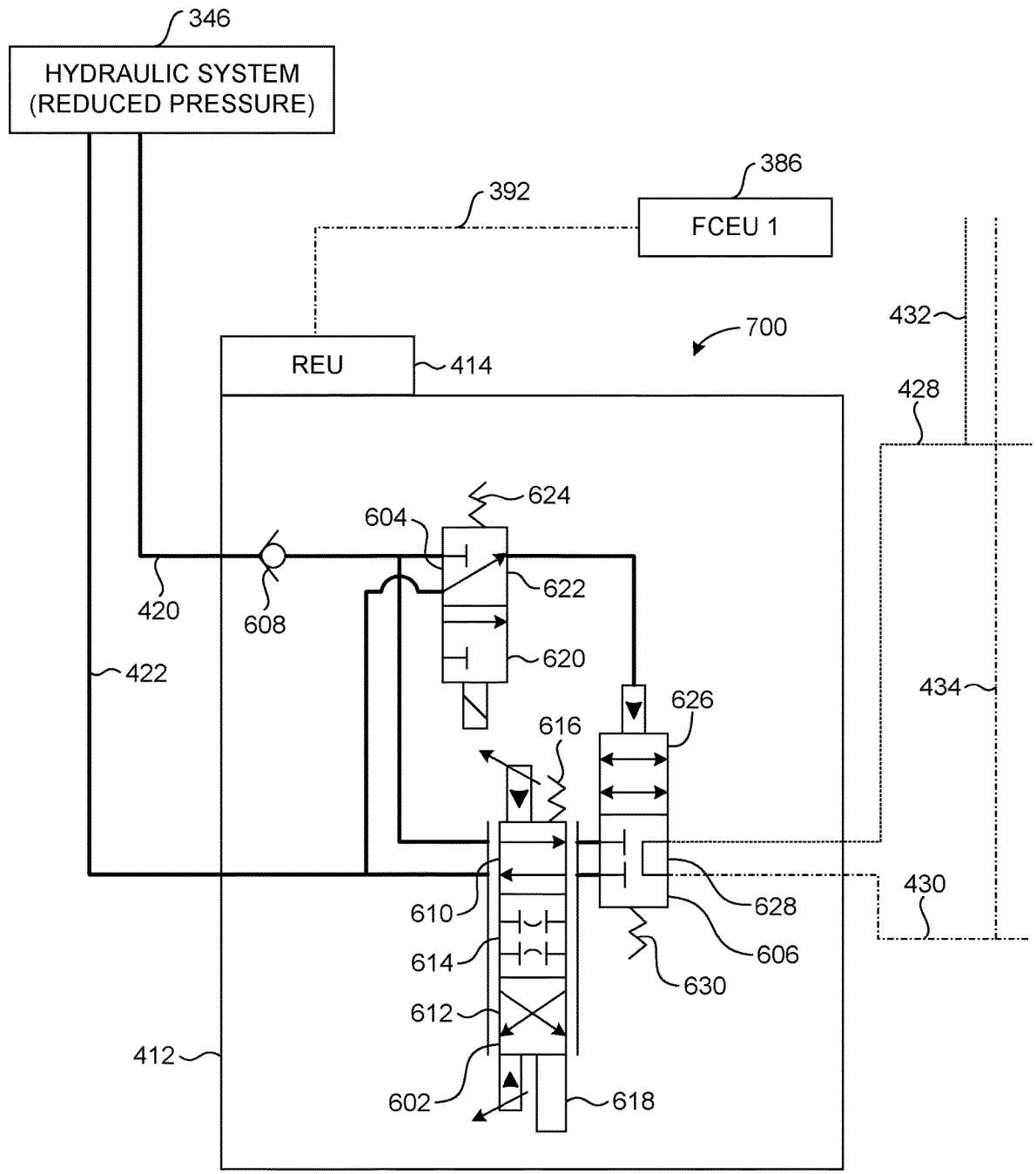
FIG. 7 is a schematic of the example hydraulic module of FIG. 4 in a second example operational mode.

FIG. 6 is a schematic of the example hydraulic module 412 of FIG. 4 in a first example operational mode 600. FIG. 7 is a schematic of the example hydraulic module 412 of FIG. 4 in a second example operational mode 700. The hydraulic module 412 of FIGS. 4, 6 and 7 can selectively place the hydraulic system supply line 420 of the hydraulic system 346 in fluid communication with either the first port 424 or the second port 426 of the HMA 402 to selectively provide pressurized hydraulic fluid to the first fluid volume 520 or the second fluid volume 522 of the HMA 402. The hydraulic module 412 of FIGS. 4, 6 and 7 can also selectively place the hydraulic system return line 422 of the hydraulic system 346 in fluid communication with either the first port 424 or the second port 426 of the HMA 402 to selectively receive pressurized hydraulic fluid from the first fluid volume 520 or the second fluid volume 522 of the HMA 402. The REU 414 of FIGS. 4, 6 and 7 includes one or more processor(s) to control and/or manage loop closure, failure detection, and/or actuation control commands associated with the hydraulic module 412.

The hydraulic module 412 of FIGS. 4, 6 and 7 includes a plurality of control valves. In some examples, one or more of the control valves can be hydraulically actuated (e.g., via pressurized hydraulic fluid supplied via the hydraulic system supply line 420). In some examples, one or more of the control valves can be electrically actuated (e.g., via the REU 414). The control valves of the hydraulic module 412 control and/or manage the routing and/or distribution of pressurized hydraulic fluid from the hydraulic system supply line 420 to the ports of the HMA 402 (e.g., the first and second ports 424, 426 of FIGS. 4 and 5 described above), and from the ports of the HMA 402 to the hydraulic system return line 422. In the illustrated examples of FIGS. 6 and 7, the hydraulic module 412 includes an example electrohydraulic servo valve (EHSV) 602, an example solenoid valve (SOV) 604, an example mode selector valve (MSV) 606, and an example check valve 608.

The EHSV 602 of FIGS. 6 and 7 is a four-way flow-control valve which produces flow as a function of input current. The EHSV 602 has three control ports that are movable and/or actuatable between an example first control port position 610 (e.g., a flap deployment flow position), an example second control port position 612 (e.g., a flap retraction flow position), and an example third control port position 614 (e.g., a null region). The EHSV 602 includes and/or is coupled to an example first bias spring 616 and an example LVDT 618. The first bias spring 616 biases the EHSV 602 into and/or toward the first control port position 610 of the EHSV 602. The LVDT 618 senses, measures and/or detects a position of the EHSV 602. In the illustrated examples of FIGS. 6 and 7, the EHSV 602 is operatively coupled to (e.g., in electrical communication with) the REU 414. The REU 414 selectively positions the EHSV 602 in one of the first, second, or third control port positions 610, 612, 614 of the EHSV 602. For example, the REU 414 can energize the EHSV 602 to move from the first control port position 610 into the second control port position 612 over the bias generated by the first bias spring 616. In some examples, the REU 414 transmits a control signal to the EHSV 602 to control the position of the EHSV 602. The REU 414 also receives an electrical signal from an actuator position feedback sensor of the HMA 402 (e.g., the actuator position feedback sensor 518 of the HMA 402) associated with the REU 414 and the hydraulic module 412. In the illustrated example of FIGS. 4, 6 and 7, the above-described electrical signals and/or connections between the REU 414 and the EHSV 602 of the hydraulic module 412 are omitted in the interest of clarity of the figures. In some examples, a dispatch requirement of the aircraft results in a higher availability requirements for the distributed trailing edge wing flap system and, as such, a single electrical channel in the SOV 604, EHSV 602, and actuator position feedback sensor is increased to dual electrical channels whereby one electrical channel interfaces with one REU and the other electrical channel interfaces with a different REU.

The SOV 604 of FIGS. 6 and 7 is a two-position valve having control ports that are movable and/or actuatable between an example first control port position 620 (e.g., a normal flow position) and an example second control port position 622 (e.g., a diverted flow position). The SOV 604 includes and/or is coupled to an example second bias spring 624. The second bias spring 624 biases the SOV 604 into and/or toward the second control port position 622 of the SOV 604. In the illustrated examples of FIGS. 6 and 7, the SOV 604 is operatively coupled to (e.g., in electrical communication with) the REU 414. The REU 414 selectively positions the SOV 604 in one of the first or second control port positions 620, 622 of the SOV 604. For example, the REU 414 can energize and/or electrically command the SOV 604 to move from the second control port position 622 into the first control port position 620 over the bias generated by the second bias spring 624. In some examples, the REU 414 can de-energize the SOV 604 in response to detecting and/or determining that a difference between an electrical signal from the LVDT 618 of the EHSV 602 and a calculated position of the EHSV 602 exceeds a threshold (e.g., a predetermined threshold), as can occur in the case of a run-away and/or improperly functioning actuator. In the illustrated example of FIGS. 4, 6 and 7, the above-described electrical signals and/or connections between the REU 414 and the SOV 604 of the hydraulic module 412 are omitted in the interest of clarity of the figures.

The MSV 606 of FIGS. 6 and 7 is a two-position valve having control ports that are movable and/or actuatable between an example first control port position 626 (e.g., an active flow position) and an example second control port position 628 (e.g., a bypassed flow position). The MSV 606 includes and/or is coupled to an example third bias spring 630. The third bias spring 630 biases the MSV 606 into and/or toward the second control port position 628 of the MSV 606. In the illustrated examples of FIGS. 6 and 7, the MSV 606 is operatively coupled to (e.g., in fluid communication with) the SOV 604. The SOV 604 selectively positions the MSV 606 in one of the first or second control port positions 626, 628 of the MSV 606. For example, the SOV 604 can supply pressurized hydraulic fluid to the MSV 606 to move the MSV 606 from the second control port position 628 into the first control port position 626 over the bias generated by the third bias spring 630.

When the MSV 606 of FIGS. 6 and 7 is positioned in the second control port position 628 (e.g., the bypassed flow position), pressurized hydraulic fluid contained within the first fluid volume 520 of the HMA 402 freely passes from the first fluid volume 520 through the first port 424 of the HMA 402, through the MSV 606 of the hydraulic module 412, through the second port 426 of the HMA 402, and into the second fluid volume 522 of the HMA 402. Pressurized hydraulic fluid contained within the second fluid volume 522 of the HMA 402 also freely passes from the second fluid volume 522 through the second port 426 of the HMA 402, through the MSV 606 of the hydraulic module 412, through the first port 424 of the HMA 402, and into the first fluid volume 520 of the HMA 402. The unrestricted exchange and/or bypass of pressurized hydraulic fluid between the first fluid volume 520 and the second fluid volume 522 of the HMA 402 enables the piston 508 of the HMA 402 to be freely movable. The position of the piston 508 and/or the position of a wing flap to which the piston 508 is coupled is/are accordingly freely movable when the MSV 606 of the hydraulic module 412 is in the second control port position 628 (e.g., the bypassed flow position).

The check valve 608 of FIGS. 6 and 7 blocks pressurized hydraulic fluid that has passed from the hydraulic system supply line 420 of the hydraulic system 346 through the check valve 608 in a first direction from returning through the check valve 608 in a second direction opposite the first direction to the hydraulic system supply line 420 of the hydraulic system 346.

The first operational mode 600 of FIG. 6 corresponds to an active mode of operation of the hydraulic module 412 of FIG. 4, in which the hydraulic system 346 of FIG. 4 is operating according to normal and/or intended conditions. When the hydraulic module 412 is in the first operational mode 600 of FIG. 6, pressurized hydraulic fluid (e.g., pressurized hydraulic fluid generated by the hydraulic system 346) is supplied from the hydraulic system 346 to the hydraulic module 412 via the hydraulic system supply line 420. The SOV 604 of the hydraulic module 412 is energized (e.g., ON). The EHSV 602 is in the first control port position 610 of the EHSV 602, the SOV 604 is in the first control port position 620 of the SOV 604, and the MSV 606 is in the first control port position 626 (e.g., the active flow position) of the MSV 606. In other examples, the EHSV 602 can be in the second control port position 612 of the EHSV 602 when the hydraulic module 412 is in the first operational mode 600 of FIG. 6. The HMA 402 of FIG. 4 is in an active mode when the hydraulic module 412 of FIG. 4 is in the first operational mode 600 of FIG. 6.

The second operational mode 700 of FIG. 7 corresponds to a bypassed mode of operation of the hydraulic module 412 of FIG. 4, in which the hydraulic system 346 of FIG. 4 is not operating according to normal and/or intended conditions (e.g., due to a partial or complete loss of pressure associated with the hydraulic system 346). When the hydraulic module 412 is in the second operational mode 700 of FIG. 7, pressurized hydraulic fluid (e.g., pressurized hydraulic fluid generated by the hydraulic system 346) is either not supplied, or is supplied at a reduced pressure, from the hydraulic system 346 to the hydraulic module 412 via the hydraulic system supply line 420. The SOV 604 of the hydraulic module 412 is deenergized (e.g., OFF). The EHSV 602 is in the first control port position 610 of the EHSV 602, the SOV 604 is in the second control port position 622 of the SOV 604, and the MSV 606 is in the second control port position 628 (e.g., the bypassed flow position) of the MSV 606. In other examples, the EHSV 602 can be in the second control port position 612 of the EHSV 602 when the hydraulic module 412 is in the second operational mode 700 of FIG. 7. The HMA 402 of FIG. 4 is in a bypassed mode when the hydraulic module 412 of FIG. 4 is in the second operational mode 700 of FIG. 7.

Figure 8:
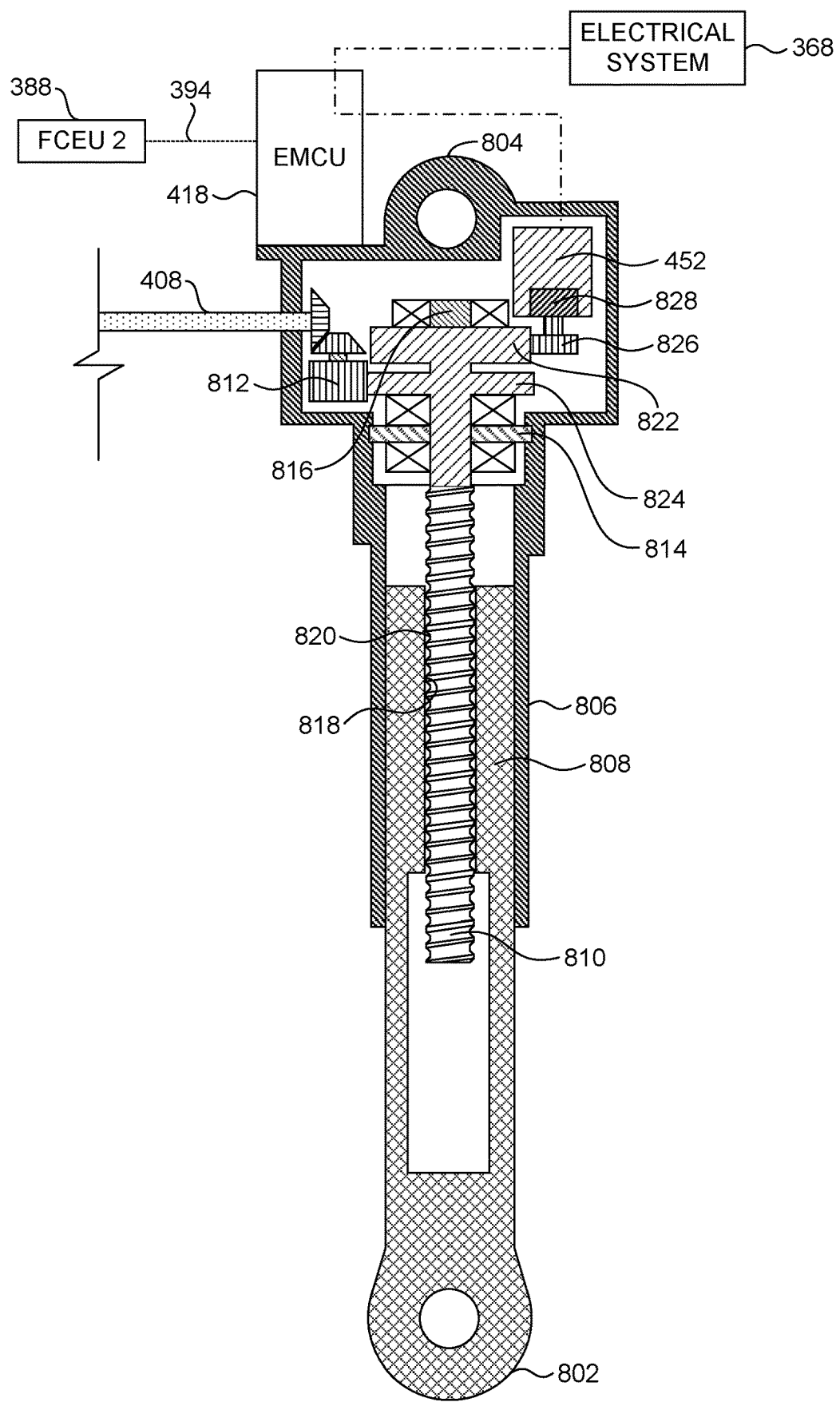
FIG. 8 is a schematic of the example electromechanical actuator of FIG. 4.

FIG. 8 is a schematic of the example EMA 404 of FIG. 4. In the illustrated example of FIG. 8, the EMA 404 includes the electric motor 452 of FIG. 4, and further includes an example first end 802, an example second end 804 located opposite the first end 802, an example case 806, an example ball nut 808, an example ball screw 810, an example gearset 812, an example no-back device 814, and an example actuator position feedback sensor 816. The first end 802 of the EMA 404 can be coupled to a linkage assembly (e.g., the second linkage assembly 208 of FIGS. 2A, 2D and 2E) of a wing flap (e.g., the first inboard flap 112, the first outboard flap 114, the second inboard flap 118, or the second outboard flap 120 of FIGS. 1 and 3), and the second end 804 of the EMA 404 can be coupled to a corresponding wing (e.g., the first wing 102 or the second wing 104 of FIGS. 1 and 3). The case 806, the ball nut 808, and the ball screw 810 of the EMA 404 have respective fixed lengths. The ball nut 808 is configured to receive the ball screw 810. The ball nut 808 is positioned, disposed, and/or received within the case 806 and is movable and/or slidable, but not rotatable, relative to the case 806 between a retracted position and an extended position. In some examples, the EMA 404 of FIG. 8 has a first length when the ball nut 808 is in the retracted position relative to the case 806, and a second length greater than the first length when the ball nut 808 is in the extended position relative to the case 806.

In the illustrated example of FIG. 8, the ball nut 808 includes an example threaded portion 818. The ball screw 810 includes an example threaded portion 820 configured to engage the threaded portion 818 of the ball nut 808. Movement (e.g., rotation) of the ball screw 810 of the EMA 404 in a first rotational direction causes movement (e.g., translation) of the ball nut 808 of the EMA 404 relative to the case 806 of the EMA 404 in a first translational direction. For example, rotating the ball screw 810 of FIG. 8 in a clockwise direction can cause the ball nut 808 of FIG. 8 to move and/or slide relative to the case 806 of FIG. 8 away from a retracted position and toward an extended position. A wing flap coupled via a linkage assembly to the first end 802 of the EMA 404 can move away from a retracted position and toward a deployed position in response to the ball nut 808 moving away from the retracted position and toward the extended position.

Conversely, movement (e.g., rotation) of the ball screw 810 of the EMA 404 in a second rotational direction opposite the first rotational direction causes movement (e.g., translation) of the ball nut 808 of the EMA 404 relative to the case 806 of the EMA 404 in a second translational direction opposite the first translational direction. For example, rotating the ball screw 810 of FIG. 8 in a counter-clockwise direction can cause the ball nut 808 of FIG. 8 to move and/or slide relative to the case 806 of FIG. 8 away from an extended position and toward a retracted position. A wing flap coupled via a linkage assembly to the first end 802 of the EMA 404 can move away from a deployed position and toward a retracted position in response to the ball nut 808 moving away from the extended position and toward the retracted position. Balls that function with the ball nut 808 and the ball screw 810 are omitted from FIGS. 4 and 8 in the interest of clarity of the figures.

The no-back device 814 of FIG. 8 is operatively coupled to the ball screw 810 of the EMA 404. The no-back device 814 is a passive braking device structured to enable only the EMA 404 to provide an actuation power flow. The no-back device 814 brakes and/or locks the ball screw 810 of the EMA 404 against any induced rotation by reason of an axial loading (e.g., tension or compression) on the ball nut 808 of the EMA 404, as can occur in response to a hydraulic failure (e.g., loss or reduction of pressurized hydraulic fluid) of the hydraulic system 346.

In the illustrated example of FIG. 8, the ball screw 810 further includes an example first gear 822 and an example second gear 824. The first gear 822 of the ball screw 810 can be coupled to and/or integrally formed with the ball screw 810. The second gear 824 of the ball screw 810 can also be coupled to and/or integrally formed with the ball screw 810. In the illustrated example of FIG. 8, the second gear 824 of the ball screw 810 is spaced apart from the first gear 822 of the ball screw 810 along the longitudinal axis of the ball screw 810. The first gear 822 of the ball screw 810 engages an example output gear 826 associated with the electric motor 452 of the EMA 404. The second gear 824 of the ball screw 810 engages the gearset 812 of the EMA 404, and the gearset 812 of the EMA 404 in turn engages the second shaft 408. The gearset 812 of FIG. 8 can include any number of gears to transfer rotational motion from the second gear 824 of the ball screw 810 to the second shaft 408.

As mentioned above, the EMCU 418 of FIGS. 4 and 8 is located at the EMA 404 of FIGS. 4 and 8, and is operatively coupled to (e.g., in electrical communication with) the electric motor 452 of the EMA 404. The electrical system 368 of FIGS. 4 and 8 is operatively coupled to (e.g., in electrical communication with) the electric motor 452 of the EMA 404 via the EMCU 418 of FIGS. 4 and 8. The second FCEU 388 of FIGS. 4 and 8 is operatively coupled to (e.g., in electrical communication with) the EMCU 418 of FIGS. 4 and 8 via the second databus 394.

In the illustrated example of FIG. 8, the EMA 404 further includes an example electric brake 828 operatively positioned between the electric motor 452 and the output gear 826. The electric brake 828 selectively operatively couples the electric motor 452 to the output gear 826 to selectively enable the electric motor 452 to drive and/or rotate the output gear 826. For example, the electric brake 828 can be moved and/or actuated into a first state in which the electric brake 828 operatively couples the electric motor 452 to the output gear 826, such that rotation of an element (e.g., a motor shaft) of the electric motor 452 causes rotation of the output gear 826, and vice-versa. The electric brake 828 can alternatively be moved and/or actuated into a second state in which the electric brake 828 does not operatively couple the electric motor 452 to the output gear 826, such that rotation of the element (e.g., the motor shaft) of the electric motor does not cause rotation of the output gear 826, and vice-versa. In some examples, the electric brake 828 can be implemented via one or more brake disc(s) that is/are movable and/or actuatable via a solenoid valve controlled by either the EMCU 418 or the second FCEU 388. In the illustrated example of FIGS. 4 and 8, the above-described electrical signals and/or connections between the electric brake 828 and either of the EMCU 418 or the second FCEU 388 are omitted in the interest of clarity of the figures.

In some examples, the electric brake 828 is engaged and/or activated in connection with a first operational mode (e.g., active mode) of the EMA 404. When the electric brake 828 is engaged and/or activated, the electric motor 452 rotates the output gear 826. Rotation of the output gear 826 via the electric motor 452 causes rotation of the first gear 822 of the ball screw 810, which in turn causes rotation of the ball screw 810, which in turn causes translation of the ball nut 808 relative to the case 806. Rotation of the first gear 822 of the ball screw 810 via the output gear 826 also causes rotation of the second gear 824 of the ball screw 810, which in turn causes rotation of the gearset 812, which in turn causes rotation of the second shaft 408. In some examples, the electric brake 828 is disengaged and/or deactivated in connection with a second operational mode (e.g., a floated mode) of the EMA 404. When the electric brake 828 is disengaged and/or deactivated, the electric motor 452 does not actively rotate the output gear 826, and the electric motor 452 accordingly has no control over the rotation of the ball screw 810 and/or the translation of the ball nut 808.

In the illustrated example of FIG. 8, the actuator position feedback sensor 816 is coupled to and/or mounted on the ball screw 810. The actuator position feedback sensor 816 senses, measures and/or detects a number of revolutions of the ball screw 810, a position of the ball screw 810 (e.g., a rotational position of the ball screw 810 relative to the case 806), and/or a position of the ball nut 808 (e.g., a translational position of the ball nut 808 relative to the case 806). The actuator position feedback sensor 816 of FIG. 8 is operatively coupled to (e.g., in electrical communication with) either the EMCU 418 or the second FCEU 388 such that the EMCU 418 or the second FCEU 388 can receive and/or obtain actuator position feedback data sensed, measured and/or detected via the actuator position feedback sensor 816. Actuator position feedback data obtained by the EMCU 418 can be conveyed to the second FCEU 388 via the second databus 394. In the illustrated example of FIGS. 4 and 8, the above-described electrical signals and/or connections between the actuator position feedback sensor 816 and either the EMCU 418 or the second FCEU 388 are omitted in the interest of clarity of the figures.

FIG. 9 is a schematic of the example HMC 410 of FIG. 4 in an example disengaged position 900. FIG. 10 is a schematic of the example HMC 410 of FIG. 4 in an example engaged position 1000. In the illustrated example of FIGS. 9 and 10, the HMC 410 includes a portion of the first shaft 406, a portion of the second shaft 408, and the port 448 of FIG. 4, and further includes an example disc stack 902, an example fluid volume 904, an example piston 906, and an example spring 908.

In the illustrated example of FIGS. 9 and 10, the disc stack 902 includes example first discs 910 and example second discs 912. The first discs 910 of the disc stack 902 of FIGS. 9 and 10 are coupled to and extend radially (e.g., radially outward) from the first shaft 406. Respective ones of the first discs 910 are axially spaced apart from one another along the first shaft 406. The second discs 912 of the disc stack 902 of FIGS. 9 and 10 are coupled to and extend radially (e.g., radially inward) from the second shaft 408. Respective ones of the second discs 912 are axially spaced apart from one another along the second shaft 408, and are located between neighboring ones of the respective ones of the first discs 910. The disc stack 902 is accordingly formed of alternating ones of the first discs 910 and the second discs 912, as shown in FIGS. 9 and 10. The second discs 912 of the disc stack 902 are selectively operatively couplable to the first discs 910 of the disc stack 902, as further described below.

The fluid volume 904 of the HMC 410 of FIGS. 9 and 10 is operatively coupled to (e.g., in fluid communication with) the accumulator module 416 via the port 448 of the HMC 410 and the HMC port fluid line 450. The fluid volume 904 contains a first example volume 914 of fluid when the HMC 410 is in the disengaged position 900 of FIG. 9, and contains a second example volume 1002 of fluid greater than the first volume 914 of fluid when the HMC 410 is in the engaged position 1000 of FIG. 10. In the illustrated example of FIGS. 9 and 10, the first volume 914 of fluid increases to the second volume 1002 of fluid in response to the fluid volume 904 receiving a volume of pressurized hydraulic fluid from the accumulator 438 of the accumulator module 416, as further described below.

The piston 906 of the HMC 410 of FIGS. 9 and 10 is operatively positioned between and operatively coupled to (e.g., in fluid and/or mechanical communication with) the fluid volume 904 of FIGS. 9 and 10 and the spring 908 of FIGS. 9 and 10. The piston 906 is located within the HMC 410 at a first example position 916 when the HMC 410 is in the disengaged position 900 of FIG. 9, and is located within the HMC 410 at a second example position 1004 when the HMC 410 is in the engaged position 1000 of FIG. 10. As shown in the illustrated example of FIGS. 9 and 10, the piston 906 moves and/or slides by a distance "D" within the HMC 410 (e.g., along the first shaft 406) from the first position 916 (e.g., as shown in FIG. 9) to the second position 1004 (e.g., as shown in FIG. 10) in response to the fluid volume 904 of the HMC 410 increasing from the first volume 914 of fluid to the second volume 1002 of fluid.

The spring 908 of the HMC 410 of FIGS. 9 and 10 is operatively positioned between and operatively coupled to (e.g., in mechanical communication with) the piston 906 of FIGS. 9 and 10 and the disc stack 902 of FIGS. 9 and 10. The spring 908 is in an example uncompressed state 918 when the HMC 410 is in the disengaged position 900 of FIG. 9, and is in an example compressed state 1006 when the HMC 410 is in the engaged position 1000 of FIG. 10. As shown in the illustrated example of FIGS. 9 and 10, the spring 908 compresses within the HMC 410 (e.g., along the first shaft 406) from the uncompressed state 918 (e.g., as shown in FIG. 9) to the compressed state 1006 (e.g., as shown in FIG. 10) in response to the piston 906 of the HMC 410 moving and/or sliding from the first position 916 to the second position 1004.

The application of compressive force to the disc stack 902 via the spring 908 (e.g., when the spring is in the compressed state 1006) causes the first discs 910 of the disc stack 902 to become operatively coupled to the second discs 912 of the disc stack 902. In some examples, the operative coupling between the first discs 910 and the second discs 912 of the disc stack 902 is formed via friction forces generated between the alternating ones of the first and second discs 910, 912 of the disc stack 902, with the friction forces being generated in response to the compressive force applied to the disc stack 902 via the spring 908.

As shown in the illustrated example of FIGS. 9 and 10, the accumulator module 416 selectively places the HMC 410 into either the disengaged position 900 of FIG. 9 or the engaged position 1000 of FIG. 10 based on whether the hydraulic system 346 and/or the hydraulic module 412 is/are functional. For example, as shown in FIG. 9, the accumulator module 416 is receiving pressurized hydraulic fluid from the hydraulic module 412 via the accumulator module supply line 432. The receipt of the pressurized hydraulic fluid at the accumulator module 416 via the accumulator module supply line 432 indicates that the hydraulic module 412 and the hydraulic system 346 are functional. When the accumulator module 416 is receiving pressurized hydraulic fluid from the hydraulic module 412 via the accumulator module supply line 432, the pressure-responsive valve 440 of the accumulator module 416 is in the first control port position 442 described above. The check valve 436 of the accumulator module 416 blocks and/or prevents the volume of pressurized hydraulic fluid collected and/or stored by the accumulator 438 of the accumulator module 416 from returning to the accumulator module supply line 432. The pressure-responsive valve 440 blocks and/or prevents the volume of pressurized hydraulic fluid collected and/or stored by the accumulator 438 of the accumulator module 416 from being supplied and/or delivered via the HMC port fluid line 450 to the port 448 of the HMC 410. When the volume of pressurized hydraulic fluid collected and/or stored by the accumulator 438 of the accumulator module 416 has not been supplied and/or delivered to the HMC 410, the HMC 410 assumes the disengaged position 900 shown in FIG. 9.

In contrast, as shown in FIG. 10, the accumulator 416 is not receiving pressurized hydraulic fluid from the hydraulic module 412 via the accumulator module supply line 432. The absence (e.g., loss or reduction) of the pressurized hydraulic fluid at the accumulator module 416 via the accumulator module supply line 432 indicates that the hydraulic module 412 and/or the hydraulic system 346 has/have experienced a hydraulic failure (e.g., loss or reduction of pressurized hydraulic fluid). When the accumulator module 416 is not receiving pressurized hydraulic fluid from the hydraulic module 412 via the accumulator module supply line 432, the pressure-responsive valve 440 of the accumulator module 416 is in the second control port position 444 described above. The check valve 436 of the accumulator module 416 blocks and/or prevents the volume of pressurized hydraulic fluid collected and/or stored by the accumulator 438 of the accumulator module 416 from returning to the accumulator module supply line 432. The pressure-responsive valve 440 allows and/or enables the volume of pressurized hydraulic fluid collected and/or stored by the accumulator 438 of FIG. 4 to be supplied and/or delivered via the HMC port fluid line 450 to the port 448 of the HMC 410. When the volume of pressurized hydraulic fluid collected and/or stored by the accumulator 438 of the accumulator module 416 has been supplied and/or delivered to the HMC 410, the HMC 410 assumes the engaged position 1000 shown in FIG. 10.

When the HMC 410 of FIGS. 9 and 10 is in the disengaged position 900 of FIG. 9, the fluid volume 904 of the HMC 410 contains the first volume 914 of fluid, the piston 906 of the HMC 410 is in the first position 916, the spring 908 of the HMC 410 is in the uncompressed state 918, and the first discs 910 of the disc stack 902 of the HMC 410 are operatively uncoupled from the second discs 912 of the disc stack 902 of the HMC 410. The first shaft 406 is accordingly operatively uncoupled from the second shaft 408 via the HMC 410, thereby preventing formation of an operative coupling between the HMA 402 and the EMA 404.

When the HMC 410 of FIGS. 9 and 10 is in the engaged position 1000 of FIG. 10, the fluid volume 904 of the HMC 410 contains the second volume 1002 of fluid, the piston 906 of the HMC 410 is in the second position 1004, the spring 908 of the HMC 410 is in the compressed state 1006, and the first discs 910 of the disc stack 902 of the HMC 410 are operatively coupled to the second discs 912 of the disc stack 902 of the HMC 410. The first shaft 406 is accordingly operatively coupled to the second shaft 408 via the HMC 410, thereby forming an operative coupling between the HMA 402 and the EMA 404.

Figure 11:
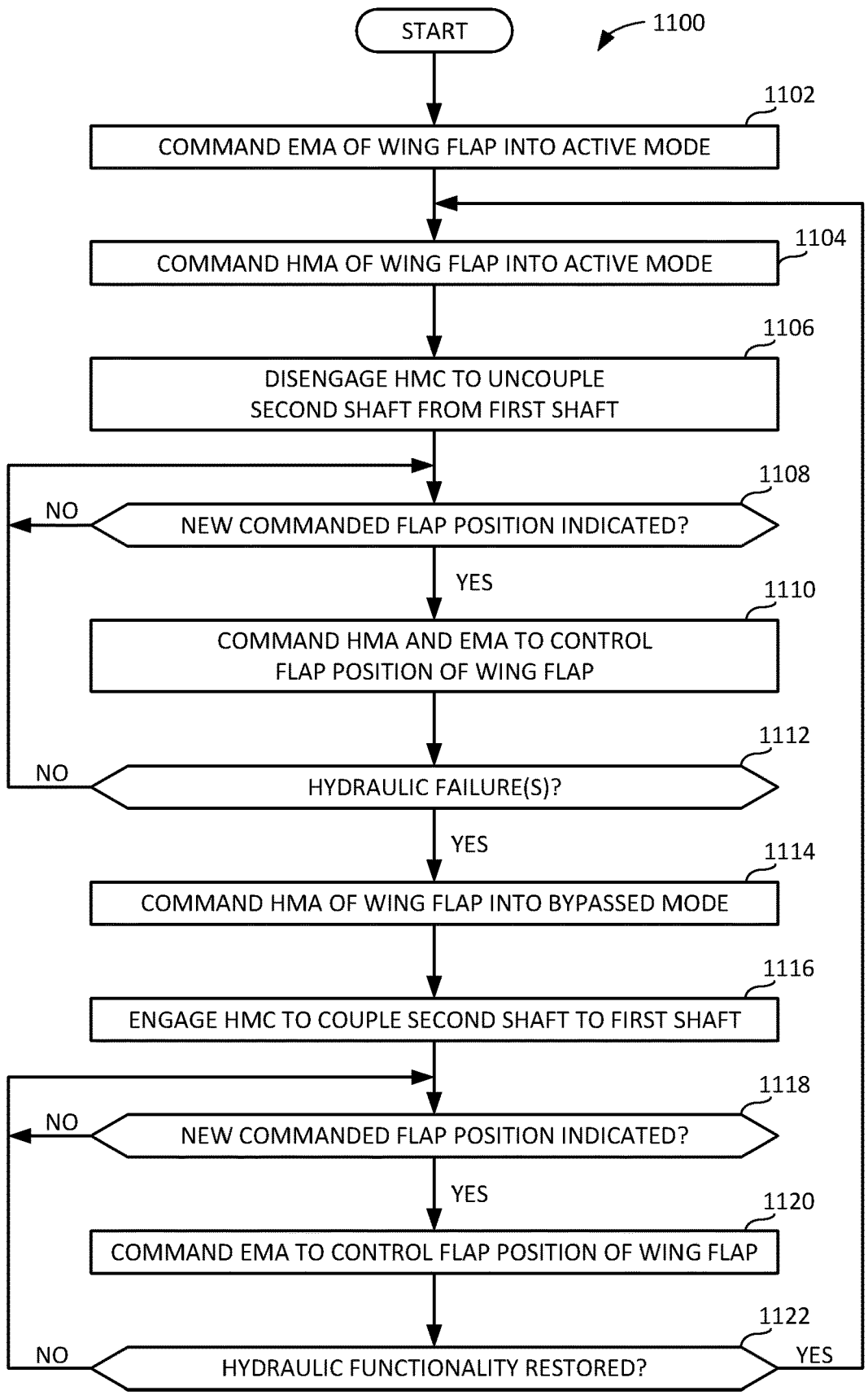
FIG. 11 is a flowchart representative of an example method for implementing the example distributed trailing edge wing flap system of FIGS. 3-10 to control the position of a wing flap.

FIG. 11 is a flowchart representative of an example method 1100 for implementing the example distributed trailing edge wing flap system 300 of FIGS. 3-10 to control the position of a wing flap. The method 1100 of FIG. 11 begins with commanding an EMA of a wing flap of the distributed trailing edge wing flap system 300 into an active mode (block 1102). For example, the second FCEU 388 of FIGS. 3, 4 and 8 can command the EMA 404 of FIGS. 4 and 8 of the wing flap (e.g., the first inboard flap 112 of FIG. 3) into the active mode. In some examples, the second FCEU 388 of FIGS. 3, 4 and 8 can command the EMA 404 of FIGS. 4 and 8 into the active mode by commanding the EMCU 418 of FIGS. 4 and 8 to engage the electric brake 828 of the EMA 404 of FIGS. 4 and 8 with the electric motor 452 of the EMA 404 of FIGS. 4 and 8. Following block 1102, the method 1100 of FIG. 11 proceeds to block 1104.

The method 1100 of FIG. 11 includes commanding an HMA of the wing flap of the distributed trailing edge wing flap system 300 into an active mode (block 1104). For example, the first FCEU 386 of FIGS. 3, 4, 6 and 7 can command the HMA 402 of FIGS. 4 and 5 of the wing flap (e.g., the first inboard flap 112 of FIG. 3), via the hydraulic module 412 and the REU 414 of FIGS. 4, 6 and 7, into the active mode described above in connection with FIG. 6. Following block 1104, the method 1100 of FIG. 11 proceeds to block 1106.

The method 1100 of FIG. 11 includes disengaging an HMC of the wing flap of the distributed trailing edge wing flap system 300 to uncouple a second shaft of the EMA from a first shaft of the HMA (block 1106). For example, the accumulator module 416 of FIGS. 4, 9 and 10 may cause the HMC 410 of FIGS. 4, 9 and 10 to assume the disengaged position 900 of FIG. 9 described above. Following block 1106, the method 1100 of FIG. 11 proceeds to block 1108.

The method 1100 of FIG. 11 includes determining whether a new commanded flap position of the wing flap is indicated by the distributed trailing edge wing flap system 300 (block 1108). For example, the first FCEU 386 and/or the second FCEU 388 of FIGS. 3, 4, 6, 7 and 8 can determine that a new commanded flap position of the wing flap is indicated based on one or more input(s) received at the first FCEU 386 and/or the second FCEU 388 from the flap lever 390 of FIG. 3. If the first FCEU 386 and/or the second FCEU 388 determine(s) at block 1108 that a new commanded flap position is not indicated, the method 1100 of FIG. 11 remains at block 1108. If the first FCEU 386 and/or the second FCEU 388 instead determine(s) at block 1108 that a new commanded flap position is indicated, the method 1100 of FIG. 11 proceeds to block 1110.

The method 1100 of FIG. 11 includes commanding the HMA and the EMA of the wing flap to control the flap position of the wing flap (block 1110). For example, the first FCEU 386 of FIGS. 3, 4, 6 and 7 can command the HMA 402 of FIGS. 4 and 5, via the hydraulic module 412 and the REU 414 of FIGS. 4, 6 and 7, to control the flap position of the wing flap. Additionally (e.g., simultaneously), the second FCEU 388 of FIGS. 3, 4 and 8 can command the EMA 404 of FIGS. 4 and 8, via the EMCU 418 and the electric motor 452 of FIGS. 4 and 8, to control the flap position of the wing flap. In some examples, the first FCEU 386 of FIGS. 3, 4, 6 and 7 can command the HMA 402 of FIGS. 4 and 5, via the hydraulic module 412 and the REU 414 of FIGS. 4, 6 and 7, to position the wing flap in a flap position corresponding to the new commanded flap position determined at block 1108. In such examples, the second FCEU 388 of FIGS. 3, 4 and 8 can additionally (e.g., simultaneously) command the EMA 404 of FIGS. 4 and 8, via the EMCU 418 and the electric motor 452 of FIGS. 4 and 8, to position the wing flap in a flap position corresponding to the new commanded flap position determined at block 1108 Following block 1110, the method 1100 of FIG. 11 proceeds to block 1112.

The method 1100 of FIG. 11 includes detecting whether the distributed trailing edge wing flap system 300 is experiencing one or more hydraulic failure(s) (block 1112). For example, the first FCEU 386 of FIGS. 3, 4 and 8 can detect one or more hydraulic failure(s) (e.g., loss(es) or reduction(s) in pressurized hydraulic fluid) of the hydraulic system 346 and/or the hydraulic module 412 of FIGS. 3, 4, 6 and 7. If no hydraulic failure(s) is/are detected at block at block 1112, the method 1100 of FIG. 11 returns to block 1108. If one or more hydraulic failure(s) is/are detected at block 1112, the method 1100 of FIG. 11 proceeds to block 1114.

The method 1100 of FIG. 11 includes commanding the HMA of the wing flap of the distributed trailing edge wing flap system 300 into a bypassed mode (block 1114). For example, the first FCEU 386 of FIGS. 3, 4, 6 and 7 can command the HMA 402 of FIGS. 4 and 5, via hydraulic module 412 and the REU 414 of FIGS. 4, 6 and 7, into the bypassed mode described above in connection with FIG. 7. Following block 1114, the method 1100 of FIG. 11 proceeds to block 1116.

The method 1100 of FIG. 11 includes engaging the HMC of the wing flap of the distributed trailing edge wing flap system 300 to couple the second shaft of the EMA to the first shaft of the HMA (block 1116). For example, the accumulator module 416 of FIGS. 4, 9 and 10 may cause the HMC 410 of FIGS. 4, 9 and 10 to assume the engaged position 1000 of FIG. 10 described above. Following block 1116, the method 1100 of FIG. 11 proceeds to block 1118.

The method 1100 of FIG. 11 includes determining whether a new commanded flap position of the wing flap is indicated by the distributed trailing edge wing flap system 300 (block 1118). For example, the first FCEU 386 and/or the second FCEU 388 of FIGS. 3, 4, 6, 7 and 8 can determine that a new commanded flap position of the wing flap is indicated based on one or more input(s) received at the first FCEU 386 and/or the second FCEU 388 from the flap lever 390 of FIG. 3. If the first FCEU 386 and/or the second FCEU 388 determine(s) at block 1118 that a new commanded flap position is not indicated, the method 1100 of FIG. 11 remains at block 1118. If the first FCEU 386 and/or the second FCEU 388 instead determine(s) at block 1118 that a new commanded flap position is indicated, the method 1100 of FIG. 11 proceeds to block 1120.

The method 1100 of FIG. 11 includes commanding the EMA of the wing flap to control the flap position of the wing flap (block 1120). For example, the second FCEU 388 of FIGS. 3, 4 and 8 can command the EMA 404 of FIGS. 4 and 8, via the EMCU 418 and the electric motor 452 of FIGS. 4 and 8, to control the flap position of the wing flap. In some examples, the second FCEU 388 of FIGS. 3, 4 and 8 can command the EMA 404 of FIGS. 4 and 5, via the EMCU 418 and the electric motor 452 of FIGS. 4 and 8, to position the wing flap in a flap position corresponding to the new commanded flap position determined at block 1118. Following block 1120, the method 1100 of FIG. 11 proceeds to block 1122.

The method 1100 of FIG. 11 includes determining whether the hydraulic functionality (e.g., the hydraulic operability) of the distributed trailing edge wing flap system 300 has been restored (block 1122). For example, the first FCEU 386 of FIGS. 3, 4, 6 and 7 can determine that the hydraulic functionality associated with the hydraulic failure(s) of the hydraulic system 346 and/or the hydraulic module 412 of FIGS. 3, 4, 6 and 7 detected at block 1112 has been restored to a functional and/or operative state. If the first FCEU 386 determines at block 1122 that the hydraulic functionality has not been restored, the method 1100 of FIG. 11 returns to block 1118. If the first FCEU 386 instead determines at block 1122 that the hydraulic functionality has been restored, the method 1100 of FIG. 11 returns to block 1104.

Figure 12:
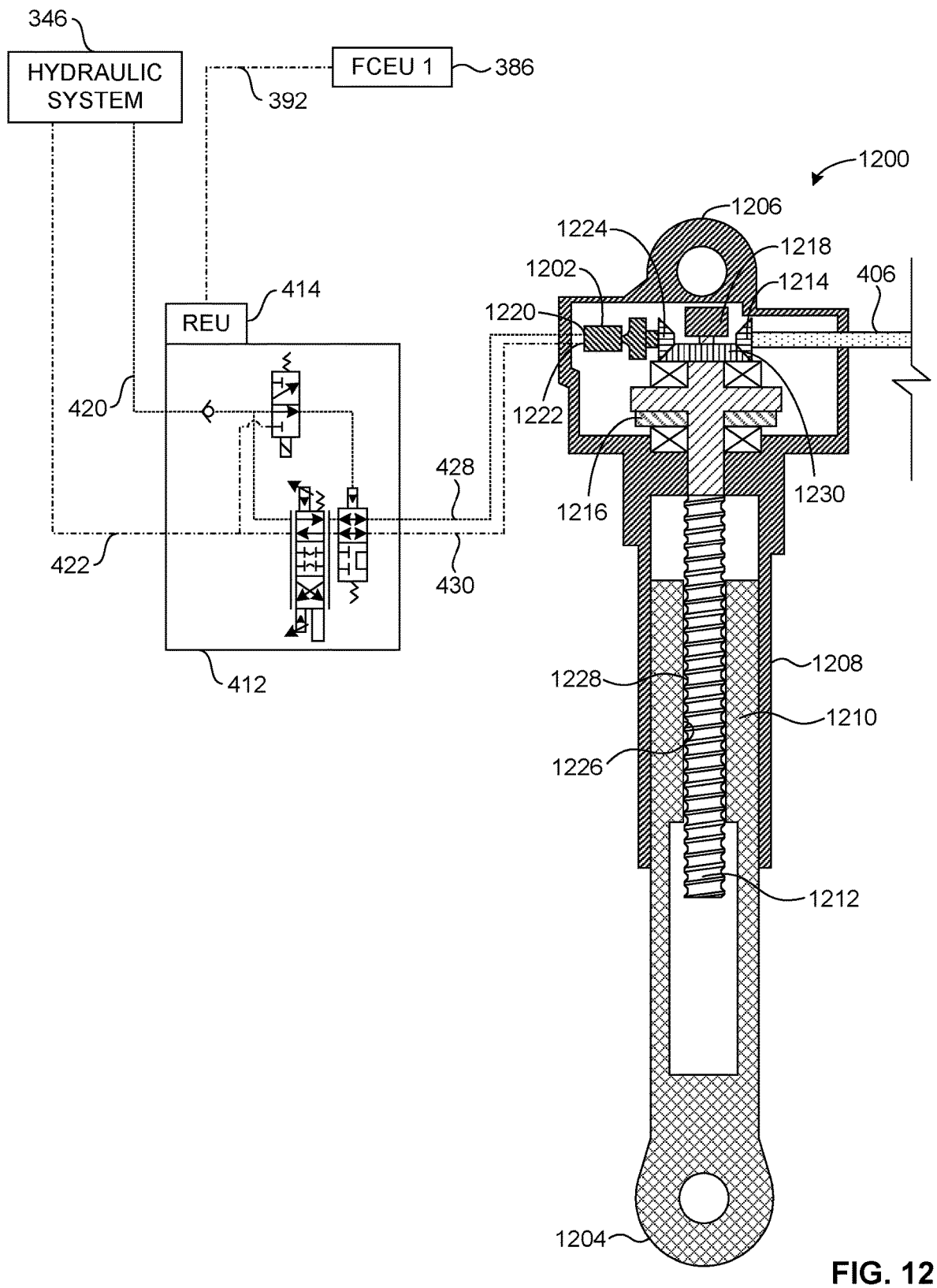
FIG. 12 is a schematic of an alternate example hydromechanical actuator that may be implemented in the example subsystem of FIG. 4 in place of the example hydromechanical actuator of FIGS. 4 and 5

FIG. 12 is a schematic of an alternate example HMA 1200 that may be implemented in the example subsystem 400 of FIG. 4 in place of the example HMA 402 of FIGS. 4 and 5 described above. The HMA 1200 of FIG. 12 is configured to interface with the example first shaft 406 and the example hydraulic module 412 of FIGS. 4, 6 and 7. In the interest of conciseness, the structure and operation of the first shaft 406 and the hydraulic module 412 described above are not repeated herein. In the illustrated example of FIG. 12, the HMA 1200 includes an example hydraulic motor 1202, an example first end 1204, an example second end 1206 located opposite the first end 1204, an example case 1208, an example ball nut 1210, an example ball screw 1212, an example gearset 1214, an example no-back device 1216, and an example actuator position feedback sensor 1218.

The HMA 1200 of FIG. 12 can be powered, controlled, and/or operated via the hydraulic motor 1202. In the illustrated example of FIG. 12, the hydraulic motor 1202 includes a first example port 1220, a second example port 1222, and an example output gear 1224. The hydraulic motor 1202 can be powered via pressurized hydraulic fluid supplied by the hydraulic system 346 and received from the hydraulic module 412 at the first port 1220 of the hydraulic motor 1202 (e.g., via the first HMA port fluid line 428) or the second port 1222 of the hydraulic motor 1202 (e.g., via the second HMA port fluid line 430). Supplying pressurized hydraulic fluid from the hydraulic module 412 to the first port 1220 of the hydraulic motor 1202 causes the hydraulic motor 1202 to rotate the output gear 1224 in a first rotational direction (e.g., clockwise). Supplying pressurized hydraulic fluid from the hydraulic module 412 to the second port 1222 of the hydraulic motor 1202 causes the hydraulic motor 1202 to rotate the output gear 1224 in a second rotational direction (e.g., counter-clockwise) opposite the first rotational direction. Movement (e.g., rotation) of the output gear 1224 of the hydraulic motor 1202 is further discussed below.

The first end 1204 of the HMA 1200 can be coupled to a linkage assembly (e.g., the first linkage assembly 206 of FIGS. 2A-2C) of a wing flap (e.g., the first inboard flap 112, the first outboard flap 114, the second inboard flap 118, or the second outboard flap 120 of FIGS. 1 and 3), and the second end 1206 of the HMA 1200 can be coupled to a corresponding wing (e.g., the first wing 102 or the second wing 104 of FIGS. 1 and 3). The case 1208, the ball nut 1210, and the ball screw 1212 of the HMA 1200 have respective fixed lengths. The ball nut 1210 is configured to receive the ball screw 1212. The ball nut 1210 is positioned, disposed, and/or received within the case 1208 and is movable and/or slidable, but not rotatable, relative to the case 1208 between a retracted position and an extended position. In some examples, the HMA 1200 of FIG. 12 has a first length when the ball nut 1210 is in the retracted position relative to the case 1208, and a second length greater than the first length when the ball nut 1210 is in the extended position relative to the case 1208.

In the illustrated example of FIG. 12, the ball nut 1210 includes an example threaded portion 1226. The ball screw 1212 includes an example threaded portion 1228 configured to engage the threaded portion 1226 of the ball nut 1210. Movement (e.g., rotation) of the ball screw 1212 of the HMA 1200 in a first rotational direction causes movement (e.g., translation) of the ball nut 1210 of the HMA 1200 relative to the case 1208 of the HMA 1200 in a first translational direction. For example, rotating the ball screw 1212 of FIG. 12 in a clockwise direction can cause the ball nut 1210 of FIG. 12 to move and/or slide relative to the case 1208 of FIG. 12 away from a retracted position and toward an extended position. A wing flap coupled via a linkage assembly to the first end 1204 of the HMA 1200 can move away from a retracted position and toward a deployed position in response to the ball nut 1210 moving away from the retracted position and toward the extended position.

Conversely, movement (e.g., rotation) of the ball screw 1212 of the HMA 1200 in a second rotational direction opposite the first rotational direction causes movement (e.g., translation) of the ball nut 1210 of the HMA 1200 relative to the case 1208 of the HMA 1200 in a second translational direction opposite the first translational direction. For example, rotating the ball screw 1212 of FIG. 12 in a counter-clockwise direction can cause the ball nut 1210 of FIG. 12 to move and/or slide relative to the case 1208 of FIG. 12 away from an extended position and toward a retracted position. A wing flap coupled via a linkage assembly to the first end 1204 of the HMA 1200 can move away from a deployed position and toward a retracted position in response to the ball nut 1210 moving away from the extended position and toward the retracted position. Balls that function with the ball nut 1210 and the ball screw 1212 are omitted from FIG. 12 in the interest of clarity of the figure.

The no-back device 1216 of FIG. 12 is operatively coupled to the ball screw 1212 of the HMA 1200. The no-back device 1216 is a passive braking device structured to enable only the HMA 1200 to provide an actuation power flow. The no-back device 1216 brakes and/or locks the ball screw 1212 of the HMA 1200 against any induced rotation by reason of an axial loading (e.g., tension or compression) on the ball nut 1210 of the HMA 1200, as can occur in response to a failure (e.g., loss or reduction of pressurized hydraulic fluid) of the hydraulic system 346.

In the illustrated example of FIG. 12, the ball screw 1212 further includes an example first gear 1230. The first gear 1230 of the ball screw 1212 can be coupled to and/or integrally formed with the ball screw 1212. The first gear 1230 of the ball screw 1212 engages the output gear 1224 of the hydraulic motor 1202 of the HMA 1200, and also engages the gearset 1214 of the HMA 1200, which in turn engages the first shaft 406. The gearset 1214 of FIG. 12 can include any number of gears to transfer rotational motion from the first gear 1230 of the ball screw 1212 to the first shaft 406.

The hydraulic motor 1202 can control the actuation of the HMA 1200 when the hydraulic system 346 and the hydraulic module 412 are functional (e.g., such that pressurized hydraulic fluid can be supplied to the first port 1220 or the second port 1222 of the hydraulic motor 1202). For example, the hydraulic motor 1202 can control the actuation of the HMA 1200 when the hydraulic system 346 and the hydraulic module 412 are functional, and the hydraulic module 412 is in the active mode shown in FIGS. 6 and 12. Powering the hydraulic motor 1202 via pressurized hydraulic fluid supplied to the first port 1220 or the second port 1222 of the hydraulic motor 1202 causes the output gear 1224 of the hydraulic motor 1202 to rotate. Rotation of the output gear 1224 via the hydraulic motor 1202 causes rotation of the first gear 1230 of the ball screw 1212, which in turn causes rotation of the ball screw 1212, which in turn causes translation of the ball nut 1210 relative to the case 1208. Rotation of the first gear 1230 of the ball screw 1212 via the output gear 1224 also causes rotation of the gearset 1214, which in turn causes rotation of the first shaft 406.

The hydraulic motor 1202 is unable to control the actuation of the HMA 1200 when the hydraulic system 346 and/or the hydraulic module 412 is/are non-functional (e.g., such that pressurized hydraulic fluid cannot be supplied to the first port 1220 or the second port 1222 of the hydraulic motor 1202). For example, the hydraulic motor 1202 is unable to control the actuation of the HMA 1200 when the hydraulic system 346 and/or the hydraulic module 412 is/are non-functional, and the hydraulic module 412 is in the bypassed mode shown in FIG. 7 above. When the HMA 1200 is in the second operational mode (e.g., bypassed mode) rotation of the first shaft 406 causes rotation of the gearset 1214 of the HMA 1200. Rotation of the gearset 1214 via the first shaft 406 causes rotation of the first gear 1230 of the ball screw 1212, which in turn causes rotation of the ball screw 1212, which in turn causes translation of the ball nut 1210 relative to the case 1208.

In the illustrated example of FIG. 12, the actuator position feedback sensor 1218 is coupled to and/or mounted on the ball screw 1212. The actuator position feedback sensor 1218 senses, measures and/or detects a number of revolutions of the ball screw 1212, a position of the ball screw 1212 (e.g., a rotational position of the ball screw 1212 relative to the case 1208), and/or a position of the ball nut 1210 (e.g., a translational position of the ball nut 1210 relative to the case 1208). The actuator position feedback sensor 1218 of FIG. 12 is operatively coupled to (e.g., in electrical communication with) the REU 414 such that the REU 414 can receive and/or obtain actuator position feedback data sensed, measured and/or detected via the actuator position feedback sensor 1218. Actuator position feedback data obtained by the REU 414 can be conveyed to the first FCEU 386 via the first databus 392. In the illustrated example of FIG. 12, the above-described electrical signals and/or connections between the actuator position feedback sensor 1218 and the REU 414 are omitted in the interest of clarity of the figures. In some examples, a dispatch requirement of the aircraft results in a higher availability requirement for the distributed trailing edge wing flap system and, as such, a single electrical channel in the SOV 604, EHSV 602, and actuator position feedback sensor 1218 is increased to dual electrical channels whereby one electrical channel interfaces with one REU and the other electrical channel interfaces with a different REU.

The HMA 1200 of FIG. 12 can be actuated by either of two independent mechanisms. First, the HMA 1200 can be actuated via the hydraulic system 346, the hydraulic module 412, and the hydraulic motor 1202 when the hydraulic system 346 and the hydraulic module 412 are operational, functional, and/or active. Second, in the event of a failure of the hydraulic system 346 or the hydraulic module 412, the HMA 1200 can alternatively be actuated via the first shaft 406, the HMC 410 (shown in FIGS. 4, 9 and 10), and the second shaft 408 (shown in FIGS. 4 and 8) under the control of the EMA 404 of FIGS. 4 and 8.

From the foregoing, it will be appreciated that the disclosed distributed trailing edge wing flap systems advantageously include an HMA and an EMA to move a wing flap relative to the fixed trailing edge of an aircraft wing. The HMA is actuatable via pressurized hydraulic fluid to be supplied from a hydraulic system of the aircraft to the HMA via a hydraulic module operatively coupled to the HMA. The EMA is actuatable via an electric motor of the EMA that is operatively coupled to an electrical system of the aircraft. A first shaft is operatively coupled to the HMA, and a second shaft is operatively coupled to the EMA. An HMC is operatively positioned between the first shaft and the second shaft. The HMC is actuatable between a disengaged position and an engaged position. The second shaft is operatively uncoupled from the first shaft when the HMC is in the disengaged position. The second shaft is operatively coupled to the first shaft when the HMC is in the engaged position.

The HMA can advantageously be actuated by either of two independent mechanisms. First, the HMA can be actuated via the hydraulic module when the hydraulic system and the hydraulic module are operational, functional, and/or active. Second, in the event of a failure of the hydraulic system or the hydraulic module, the HMA can alternatively be actuated via the first shaft, the clutch, and the second shaft under the control of the EMA.

In some examples, a wing flap system for an aircraft is disclosed. In some disclosed examples, the wing flap system comprises a flap and first and second actuators. In some disclosed examples, the flap is movable between a deployed position and a retracted position relative to a fixed trailing edge of a wing of the aircraft. In some disclosed examples, the first and second actuators are configured to move the flap relative to the fixed trailing edge. In some disclosed examples, the first actuator is actuatable via pressurized hydraulic fluid to be supplied from a hydraulic system of the aircraft to the first actuator via a hydraulic module operatively coupled to the first actuator. In some disclosed examples, the first actuator is operatively coupled to a first shaft. In some disclosed examples, the second actuator is actuatable via an electric motor of the second actuator. In some disclosed examples, the electric motor is operatively coupled to an electrical system of the aircraft. In some disclosed examples, the second actuator is operatively coupled to a second shaft. In some disclosed examples, the first and second shafts are selectively operatively couplable via a clutch operatively positioned between the first and second shafts. In some disclosed examples, the clutch is actuatable between a disengaged position in which the second shaft is operatively uncoupled from the first shaft and an engaged position in which the second shaft is operatively coupled to the first shaft.

In some disclosed examples, the first shaft is configured to rotate in response to actuation of the first actuator via the pressurized hydraulic fluid.

In some disclosed examples, the second shaft is configured to rotate in response to actuation of the second actuator via the electric motor.

In some disclosed examples, the clutch is configured to be actuated from the disengaged position into the engaged position in response to a failure of the hydraulic system or of the hydraulic module.

In some disclosed examples, the first shaft is configured to rotate in response to rotation of the second shaft when the clutch is in the engaged position. In some disclosed examples, the rotation of the first shaft is configured to actuate the first actuator.

In some disclosed examples, the first actuator is actuatable via the rotation of the first shaft independently of the first actuator being actuatable via the pressurized hydraulic fluid.

In some disclosed examples, wing flap system further comprises a valve operatively positioned between the hydraulic module and the clutch. In some disclosed examples, the valve is actuatable between a first control port position and a second control port position. In some disclosed examples, the clutch is in the disengaged position in response to the valve being in the first control port position. In some disclosed examples, the clutch is in the engaged position in response to the valve being in the second control port position.

In some disclosed examples, the valve is hydraulically biased into the first control port position via the pressurized hydraulic fluid delivered via the hydraulic module. In some disclosed examples, the valve is mechanically biased into the second control port position in response to a failure of the hydraulic system or of the hydraulic module.

In some disclosed examples, the wing flap system further comprises an accumulator operatively positioned between the valve and the hydraulic module. In some disclosed examples, the accumulator is configured to collect a volume of pressurized hydraulic fluid received at the accumulator from the pressurized hydraulic fluid being delivered to the first actuator via the hydraulic module.

In some disclosed examples, the wing flap system further comprises a check valve operatively positioned between the accumulator and the hydraulic module. In some disclosed examples, the check valve is configured to prevent the volume of pressurized hydraulic fluid collected at the accumulator from returning to the hydraulic module.

In some disclosed examples, the accumulator is configured to store the volume of pressurized hydraulic fluid while the valve is in the first control port position. In some disclosed examples, the accumulator is configured to supply the volume of pressurized hydraulic fluid to the clutch in response to the valve being actuated from the first control port position into the second control port position.

In some disclosed examples, the clutch comprises a disc stack. In some disclosed examples, the disc stack includes first discs and second discs. In some disclosed examples, the first discs are coupled to and extend radially from the first shaft. In some disclosed examples, respective ones of the first discs are axially spaced apart from one another along the first shaft. In some disclosed examples, the second discs are coupled to and extend radially from the second shaft. In some disclosed examples, respective ones of the second discs are axially spaced apart from one another along the second shaft and are located between the respective ones of the first discs. In some disclosed examples, the second discs are selectively operatively couplable to the first discs. In some disclosed examples, the second shaft is operatively uncoupled from the first shaft when the second discs are operatively uncoupled from the first discs. In some disclosed examples, the second shaft is operatively coupled to the first shaft when the second discs are operatively coupled to the first discs.

In some disclosed examples, the clutch further comprises a fluid volume, a piston and a spring. In some disclosed examples, the fluid volume is operatively coupled to the valve. In some disclosed examples, the fluid volume is configured to increase in response to receiving the volume of pressurized hydraulic fluid from the accumulator. In some disclosed examples, the piston is operatively coupled to the fluid volume. In some disclosed examples, the piston is configured to move from a first position to a second position in response to the increase in the fluid volume. In some disclosed examples, the spring is operatively positioned between the piston and the disc stack. In some disclosed examples, the spring is configured to compress the disc stack when the piston is in the second position configured to operatively couple the second discs to the first discs.

In some examples, a method for operating a wing flap system of an aircraft is disclosed. In some disclosed examples of the method, the wing flap system includes a flap movable between a deployed position and a retracted position relative to a fixed trailing edge of a wing of the aircraft and further including first and second actuators configured to move the flap relative to the fixed trailing edge, the first actuator being operatively coupled to a first shaft, the second actuator being operatively coupled to a second shaft, the first and second shafts being selectively operatively couplable via a clutch operatively positioned between the first and second shafts. In some disclosed examples, the method comprises disengaging the clutch to operatively uncouple the first shaft from the second shaft. In some disclosed examples, the method further comprises commanding the first actuator to control movement of the flap relative to the fixed trailing edge, the first actuator being actuatable via pressurized hydraulic fluid to be supplied from a hydraulic system of the aircraft to the first actuator via a hydraulic module operatively coupled to the first actuator. In some disclosed examples, the method further comprises commanding the second actuator to control movement of the flap relative to the fixed trailing edge, the second actuator being actuatable via an electric motor of the second actuator, the electric motor being operatively coupled to an electrical system of the aircraft. In some disclosed examples, the method further comprises, in response to a failure of the hydraulic system or the hydraulic module, engaging the clutch to operatively couple the first shaft to the second shaft. In some disclosed examples, the method further comprises controlling movement of the first actuator via the second actuator in response to engaging the clutch.

In some disclosed examples, the method comprises disengaging a clutch to operatively uncouple a first shaft from a second shaft. In some disclosed examples, the clutch is operatively positioned between the first shaft and the second shaft. In some disclosed examples, the method further comprises commanding a first actuator to move a flap relative to a fixed trailing edge of a wing of the aircraft. In some disclosed examples, the first actuator is actuatable via pressurized hydraulic fluid to be supplied from a hydraulic system of the aircraft to the first actuator via a hydraulic module operatively coupled to the first actuator. In some disclosed examples, the first shaft is operatively coupled to the first actuator. In some disclosed examples, the method further comprises commanding a second actuator to move the flap relative to the fixed trailing edge. In some disclosed examples, the second actuator is actuatable via an electric motor of the second actuator. In some disclosed examples, the electric motor is operatively coupled to an electrical system of the aircraft. In some disclosed examples, the second shaft is operatively coupled to the second actuator. In some disclosed examples, the method further comprises, in response to a failure of the hydraulic system or the hydraulic module, engaging the clutch to operatively couple the first shaft to the second shaft. In some disclosed examples, the method further comprises controlling movement of the first actuator via the second actuator in response to engaging the clutch.

In some disclosed examples, the method further comprises commanding the first actuator into an active mode prior to commanding the first actuator to control movement of the flap relative to the fixed trailing edge. In some disclosed examples, the method further comprises commanding the first actuator from the active mode into a bypassed mode prior to engaging the clutch.

In some disclosed examples, the method further comprises rotating the first shaft in response to actuation of the first actuator via the pressurized hydraulic fluid.

In some disclosed examples, the method further comprises rotating the second shaft in response to actuation of the second actuator via the electric motor.

In some disclosed examples, controlling movement of the first actuator via the second actuator comprises rotating the second shaft in response to actuation of the second actuator, rotating the first shaft via the second shaft and the clutch, and actuating the first actuator in response to rotating the first shaft.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A wing flap system for an aircraft, the wing flap system comprising:
    a flap movable between a deployed position and a retracted position relative to a fixed trailing edge of a wing of the aircraft; and
    first and second actuators configured to move the flap relative to the fixed trailing edge, the first actuator being actuatable via pressurized hydraulic fluid to be supplied from a hydraulic system of the aircraft to the first actuator via a hydraulic module operatively coupled to the first actuator, the hydraulic module being in fluid communication with the hydraulic system and the first actuator, the first actuator being operatively coupled to a first shaft, the second actuator being actuatable via an electric motor of the second actuator, the electric motor being operatively coupled to an electrical system of the aircraft, the second actuator being operatively coupled to a second shaft, the first and second shafts being selectively operatively couplable via a clutch operatively positioned between the first and second shafts, the clutch being actuatable between a disengaged position in which the second shaft is operatively uncoupled from the first shaft and an engaged position in which the second shaft is operatively coupled to the first shaft.

2. The wing flap system of claim 1, wherein the first shaft is configured to rotate in response to actuation of the first actuator via the pressurized hydraulic fluid.

3. The wing flap system of claim 1, wherein the second shaft is configured to rotate in response to actuation of the second actuator via the electric motor.

4. The wing flap system of claim 1, wherein the clutch is configured to be actuated from the disengaged position into the engaged position in response to a failure of the hydraulic system or of the hydraulic module.

5. The wing flap system of claim 1, wherein the first shaft is configured to rotate in response to rotation of the second shaft when the clutch is in the engaged position, and wherein the rotation of the first shaft is configured to actuate the first actuator.

6. The wing flap system of claim 5, wherein the first actuator is actuatable via the rotation of the first shaft independently of the first actuator being actuatable via the pressurized hydraulic fluid.

7. The wing flap system of claim 1, further comprising a valve operatively positioned between the hydraulic module and the clutch, the valve being actuatable between a first control port position and a second control port position, the clutch being in the disengaged position in response to the valve being in the first control port position, the clutch being in the engaged position in response to the valve being in the second control port position.

8. The wing flap system of claim 7, wherein the valve is hydraulically biased into the first control port position via the pressurized hydraulic fluid delivered via the hydraulic module.

9. The wing flap system of claim 8, wherein the valve is mechanically biased into the second control port position in response to a failure of the hydraulic system or of the hydraulic module.

10. The wing flap system of claim 7, further comprising an accumulator operatively positioned between the valve and the hydraulic module, the accumulator configured to collect a volume of pressurized hydraulic fluid received at the accumulator from the pressurized hydraulic fluid being delivered to the first actuator via the hydraulic module.

11. The wing flap system of claim 10, further comprising a check valve operatively positioned between the accumulator and the hydraulic module, the check valve configured to prevent the volume of pressurized hydraulic fluid collected at the accumulator from returning to the hydraulic module.

12. The wing flap system of claim 10, wherein the accumulator is configured to store the volume of pressurized hydraulic fluid while the valve is in the first control port position, the accumulator configured to supply the volume of pressurized hydraulic fluid to the clutch in response to the valve being actuated from the first control port position into the second control port position.

13. The wing flap system of claim 12, wherein the clutch comprises a disc stack, the disc stack including:
  first discs coupled to and extending radially from the first shaft, respective ones of the first discs being axially spaced apart from one another along the first shaft; and
  second discs coupled to and extending radially from the second shaft, respective ones of the second discs being axially spaced apart from one another along the second shaft and located between the respective ones of the first discs, the second discs being selectively operatively couplable to the first discs, the second shaft being operatively uncoupled from the first shaft when the second discs are operatively uncoupled from the first discs, the second shaft being operatively coupled to the first shaft when the second discs are operatively coupled to the first discs.

14. The wing flap system of claim 13, wherein the clutch further comprises:
  a fluid volume operatively coupled to the valve, the fluid volume configured to increase in response to receiving the volume of pressurized hydraulic fluid from the accumulator;
  a piston operatively coupled to the fluid volume, the piston configured to move from a first position to a second position in response to the increase in the fluid volume; and
  a spring operatively positioned between the piston and the disc stack, the spring configured to compress the disc stack when the piston is in the second position configured to operatively couple the second discs to the first discs.

15. A method for operating a wing flap system of an aircraft, the wing flap system including a flap movable between a deployed position and a retracted position relative to a fixed trailing edge of a wing of the aircraft and further including first and second actuators configured to move the flap relative to the fixed trailing edge, the first actuator being operatively coupled to a first shaft, the second actuator being operatively coupled to a second shaft, the first and second shafts being selectively operatively couplable via a clutch operatively positioned between the first and second shafts, the method comprising:
  disengaging the clutch to operatively uncouple the first shaft from the second shaft;
  commanding the first actuator to control movement of the flap relative to the fixed trailing edge, the first actuator being actuatable via pressurized hydraulic fluid to be supplied from a hydraulic system of the aircraft to the first actuator via a hydraulic module operatively coupled to the first actuator, the hydraulic module being in fluid communication with the hydraulic system and the first actuator;
  commanding the second actuator to control movement of the flap relative to the fixed trailing edge, the second actuator being actuatable via an electric motor of the second actuator, the electric motor being operatively coupled to an electrical system of the aircraft;
  in response to a failure of the hydraulic system or the hydraulic module, engaging the clutch to operatively couple the first shaft to the second shaft; and
  controlling movement of the first actuator via the second actuator in response to engaging the clutch.

16. The method of claim 15, further comprising commanding the first actuator into an active mode prior to commanding the first actuator to control movement of the flap relative to the fixed trailing edge.

17. The method of claim 16, further comprising commanding the first actuator from the active mode into a bypassed mode prior to engaging the clutch.

18. The method of claim 15, further comprising rotating the first shaft in response to actuation of the first actuator via the pressurized hydraulic fluid.

19. The method of claim 15, further comprising rotating the second shaft in response to actuation of the second actuator via the electric motor.

20. The method of claim 15, wherein controlling movement of the first actuator via the second actuator comprises:
  rotating the second shaft in response to actuation of the second actuator;
  rotating the first shaft via the second shaft and the clutch; and
  actuating the first actuator in response to rotating the first shaft.

21. A wing flap system for an aircraft, the wing flap system comprising:
  a flap movable between a deployed position and a retracted position relative to a fixed trailing edge of a wing of the aircraft; and
  first and second actuators configured to move the flap relative to the fixed trailing edge, the first actuator being actuatable via pressurized hydraulic fluid to be supplied from a hydraulic system of the aircraft to the first actuator via a hydraulic module operatively coupled to the first actuator, the hydraulic module being in fluid communication with the hydraulic system and the first actuator, the first actuator being operatively coupled to a first shaft, the second actuator being actuatable via an electric motor of the second actuator, the electric motor being operatively coupled to an electrical system of the aircraft, the second actuator being operatively coupled to a second shaft, the first and second shafts being selectively operatively couplable via a hydromechanical clutch operatively positioned between the first and second shafts, the hydromechanical clutch being in fluid communication with an accumulator module operatively positioned between the hydraulic module and the hydromechanical clutch, the hydromechanical clutch being actuatable between a disengaged position in which the second shaft is operatively uncoupled from the first shaft and an engaged position in which the second shaft is operatively coupled to the first shaft.

* * * * *